US011265849B2

(12) United States Patent
Zhang et al.

(10) Patent No.: US 11,265,849 B2
(45) Date of Patent: Mar. 1, 2022

(54) GRANT-BASED UPLINK TRANSMISSION IN UNLICENSED BAND

(71) Applicant: Huawei Technologies Co., Ltd., Shenzhen (CN)

(72) Inventors: Jiayin Zhang, Shanghai (CN); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/901,807

(22) Filed: Jun. 15, 2020

(65) Prior Publication Data

US 2020/0314809 A1 Oct. 1, 2020

Related U.S. Application Data

(63) Continuation of application No. 15/989,202, filed on May 25, 2018, now Pat. No. 10,687,313.

(Continued)

(51) Int. Cl.
*H04W 72/04* (2009.01)
*H04W 72/12* (2009.01)
(Continued)

(52) U.S. Cl.
CPC ....... *H04W 72/04* (2013.01); *H04W 72/1268* (2013.01); *H04W 72/14* (2013.01); *H04W 74/0808* (2013.01)

(58) Field of Classification Search
None
See application file for complete search history.

(56) References Cited

U.S. PATENT DOCUMENTS

2015/0365973 A1    12/2015   Choi et al.
2017/0202022 A1*   7/2017    Chendamarai Kannan ................
                                                              H04W 72/14
(Continued)

FOREIGN PATENT DOCUMENTS

CN    104333873 A    2/2015
WO    2016081375 A1  5/2016
(Continued)

OTHER PUBLICATIONS

UE procedures related to Sidelink, 3GPP TS 36.213, Mar. 2018, 58 Pages, V15.1.0.
(Continued)

*Primary Examiner* — Diane L Lo
(74) *Attorney, Agent, or Firm* — Slater Matsil, LLP

(57) ABSTRACT

Methods and devices for grant-based uplink transmission in an unlicensed band are provided. Uplink grant messages are transmitted to electronic devices (EDs) in order to indicate time-frequency resources that are allocated to the EDs for uplink transmission in an unlicensed spectrum band. For a given ED, in the event that a first listen-before-talk (LBT) operation for the time-frequency resource allocated to the ED fails, the ED performs a second LBT operation within the allocated time-frequency resource at a start time based on a start point configuration within the allocated time-frequency resource. If the second LBT operation succeeds, the ED transmits an uplink transmission within a remaining portion of the allocated time-frequency resource that includes an activation signal to indicate a start of the uplink transmission, and uplink payload data.

20 Claims, 17 Drawing Sheets

Related U.S. Application Data

(60) Provisional application No. 62/512,551, filed on May 30, 2017.

(51) Int. Cl.
*H04W 72/14* (2009.01)
*H04W 74/08* (2009.01)

(56) References Cited

U.S. PATENT DOCUMENTS

| | | | |
|---|---|---|---|
| 2017/0325115 A1 | 11/2017 | Matsumoto et al. | |
| 2018/0255578 A1 | 9/2018 | Kim et al. | |
| 2018/0302926 A1* | 10/2018 | Bhorkar | H04W 28/065 |
| 2018/0323935 A1* | 11/2018 | Yerramalli | H04L 5/0053 |
| 2018/0367282 A1* | 12/2018 | Li | H04W 72/0446 |
| 2019/0159253 A1 | 5/2019 | Koorapaty et al. | |
| 2019/0289635 A1* | 9/2019 | Wang | H04W 74/0808 |
| 2019/0342915 A1* | 11/2019 | Kim | H04W 72/0446 |
| 2020/0275490 A1* | 8/2020 | Li | H04L 5/0007 |

FOREIGN PATENT DOCUMENTS

| | | |
|---|---|---|
| WO | 2016121672 A1 | 8/2016 |
| WO | 2016122784 A1 | 8/2016 |
| WO | 2017049560 A1 | 3/2017 |

OTHER PUBLICATIONS

Draft Standard for Information technology—Tele-communications and information exchange between systems Local and metropolitan area networks—Specific requirements, IEEE P802.11ax/D2.3, 660 Pages, Apr. 2018.

LG Electronics, "Discussion on multiple starting and ending positions for LAA UL", 3GPP TSG RAN WG1 Meeting #89, R1-1709160, May 15-19, 2017, 4 pages, Hangzhou, P.R. China.

Ericsson, "Multiple starting and ending positions for LAA UL", 3GPP TSG RAN WG1 Meeting #89, R1-1708962, May 15-19, 2017, 3 Pages, Hangzhou, P.R. China.

Huawei et al., "Support for multiple starting and ending positions in a subframe for UL on SCell with frame structure 3", 3GPP TSG RAN WG1 Meeting #88bis, R1-1704299, Apr. 3-7, 2017, 4 Pages, Spokane, USA.

Qualcomm Incorporated, "Design details of start and end partial subframes for UL LAA", 3GPP TSG RAN WG1 #89, R1-1708785, May 15-19, 2017, 5 Pages, Hangzhou, China.

* cited by examiner

GRANT-BASED UPLINK TRANSMISSION IN UNLICENSED BAND

CROSS-REFERENCE TO RELATED APPLICATION

This application is a continuation of U.S. patent application Ser. No. 15/989,902, entitled "GRANT-BASED UPLINK TRANSMISSION IN UNLICENSED BAND," filed on May 25, 2018, which claims the benefit of U.S. Provisional Patent Application No. 62/512,551, entitled "GRANT-BASED UPLINK TRANSMISSION IN UNLICENSED BAND," filed on May 30, 2017, all of which applications are hereby incorporated by reference herein in their entireties.

TECHNICAL FIELD

The present disclosure relates generally to wireless communications and, in particular, to grant-based uplink transmission in an unlicensed band.

BACKGROUND

In wireless communication systems, an electronic device (ED) such as a user equipment (UE) wirelessly communicates with a Transmission and Receive Point (TRP), termed "base station", to send data to the ED and/or receive data from the ED. A wireless communication from an ED to a base station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and during a particular time slot. The frequency and time slot used is an example of a physical communication resource.

In an LTE grant-based transmission, the required transmission control parameters are typically communicated via a Physical Uplink Control Channel (PUCCH) and/or Physical Downlink Control Channel (PDCCH). The base station is aware of the identity of the ED sending the uplink transmission using the granted uplink resources, because the base station specifically granted those uplink resources to that ED.

Some modes of communication may enable communications with an ED over an unlicensed spectrum band, or over different spectrum bands (e.g., an unlicensed spectrum band and a licensed spectrum band) of a wireless network. Given the scarcity and expense of bandwidth in the licensed spectrum, exploiting the vast and free-of-charge unlicensed spectrum to offload at least some communication traffic is an approach that has garnered interest from mobile broadband (MBB) network operators. For example, in some cases uplink transmissions may be transmitted over an unlicensed spectrum band. Accordingly, efficient and fair mechanisms for grant-based uplink transmissions in the unlicensed spectrum may be desirable.

SUMMARY

According to a first aspect, the present disclosure provides a method for an Electronic Device (ED) in a wireless network. The method according to the first aspect includes receiving an uplink grant message from a base station, the uplink grant message indicating a time-frequency resource allocated to the ED for uplink transmission in an unlicensed spectrum band. The method according to the first aspect further includes performing a first listen-before-talk (LBT) operation for the allocated time-frequency resource, and performing a second LBT operation within the allocated time-frequency resource.

In some embodiments of the method according to the first aspect of the present disclosure, the method further includes transmitting an uplink transmission within a remaining portion of the allocated time-frequency resource in response to the second LBT operation succeeding. In such embodiments, the uplink transmission may include an activation signal to indicate a start of the uplink transmission and uplink payload data.

In some embodiments of the method according to the first aspect of the present disclosure, the second LBT operation is performed at a start time based on a start point configuration within the allocated time frequency resource.

In some embodiments of the method according to the first aspect of the present disclosure, the start point configuration indicates the configuration of a plurality of possible start points of uplink transmission within a subframe.

In some embodiments of the method according to the first aspect of the present disclosure, each start point is either at an OFDM symbol boundary or midway between adjacent OFDM symbol boundaries, within the allocated time-frequency resource.

In some embodiments of the method according to the first aspect of the present disclosure, the method further includes receiving, from the base station, information indicating the start point configuration.

In some embodiments of the method according to the first aspect of the present disclosure, the activation signal is a demodulation reference signal (DMRS).

In some embodiments of the method according to the first aspect of the present disclosure, transmitting an uplink transmission within the remaining portion of the allocated time-frequency resource comprises transmitting the uplink transmission with one or more blanking intervals within the remaining portion of the allocated time-frequency resource based on the start point configuration.

In some embodiments of the method according to the first aspect of the present disclosure, performing a second LBT operation within the allocated time-frequency resource comprises performing an LBT operation at each of a plurality of start times based on the start point configuration until one of the LBT operations succeeds.

In some embodiments of the method according to the first aspect of the present disclosure, the second LBT operation is performed during one or more orthogonal frequency division multiplexing (OFDM) symbol intervals immediately preceding a start point within the allocated time-frequency resource.

In some embodiments of the method according to the first aspect of the present disclosure, the method further includes, in response to the second LBT operation succeeding, transmitting a reservation signal between the start point of uplink transmission and the closest OFDM symbol boundary after the start point.

In some embodiments of the method according to the first aspect of the present disclosure, the reservation signal includes a cyclic prefix extension of the following OFDM symbol.

In some embodiments of the method according to the first aspect of the present disclosure, transmitting an uplink transmission within a remaining portion of the allocated time-frequency resource comprises transmitting the activation signal at a start point that is part of a pre-configured subset of possible start points within the allocated time-frequency resource.

In some embodiments of the method according to the first aspect of the present disclosure, the activation signal is selected by the ED from among a plurality of activation signals associated with the ED. In such embodiments, the plurality of activation signals may include a first activation signal to indicate that uplink transmission started at a start point that preceded the start point at which the first activation signal is transmitted, and a second activation signal to indicate that uplink transmission started at or after the start point at which the first activation signal is transmitted.

In some embodiments of the method according to the first aspect of the present disclosure: the ED is allocated a subset of subcarriers of a component carrier (CC) bandwidth; the second LBT operation is a wideband LBT operation that is based on energy measured on all of the subcarriers of the CC bandwidth during one or more OFDM symbol intervals immediately preceding a start point within the allocated time-frequency resource; and transmitting the uplink transmission comprises transmitting the uplink transmission on the allocated subset of subcarriers within the remaining portion of the allocated time-frequency resource with one or more blanking intervals based on the start point configuration.

In some embodiments of the method according to the first aspect of the present disclosure: the ED is allocated a subset of subcarriers of a component carrier (CC) bandwidth; the second LBT operation is a narrowband LBT operation that is based on energy measured on the allocated subset of subcarriers during one or more OFDM symbol intervals immediately preceding a start point within the allocated time-frequency resource; and transmitting the uplink transmission comprises transmitting the uplink transmission on the allocated subset of subcarriers within the remaining portion of the allocated time-frequency resource.

In some embodiments of the method according to the first aspect of the present disclosure, the first LBT operation is a wideband LBT operation that is based on energy measured on all of the subcarriers of the CC bandwidth during one or more OFDM symbol intervals immediately preceding or immediately after a sub-frame boundary of the time-frequency resource.

In some embodiments of the method according to the first aspect of the present disclosure: the ED is allocated an interlace of a plurality of subsets of subcarriers of the CC bandwidth, the subsets of subcarriers of the interlace being distributed within the CC bandwidth; the second LBT operation is one of a plurality of second LBT operations that are respectively based on energy measured on a respective one of the subsets of subcarriers of the CC bandwidth during one or more OFDM symbol intervals immediately preceding the start point within the allocated time-frequency resource; and transmitting the uplink transmission comprises transmitting, within the remaining portion of the allocated time-frequency resource, an uplink transmission on one or more of the allocated subsets of subcarriers for which the respective narrowband LBT procedure was successful.

In some embodiments of the method according to the first aspect of the present disclosure: the ED is allocated a set of subcarriers of a first component carrier (CC) bandwidth; the first and second LBT operations are based on energy measured on the allocated set of subcarriers of the first CC bandwidth; transmitting the uplink transmission comprises transmitting a first uplink transmission on the allocated set of subcarriers of the first CC bandwidth within a first remaining portion of the allocated time-frequency resource; the ED is allocated a set of subcarriers of a second CC bandwidth that is non-overlapping with the first CC bandwidth. In such embodiments, the method may further include performing LBT operations that are based on energy measured on the allocated set of subcarriers of the second CC bandwidth at the same time that the LBT operations that are based on energy measured on the allocated set of subcarriers of the first CC bandwidth are performed.

In some embodiments of the method according to the first aspect of the present disclosure, the method further includes: continuing to perform LBT operations that are based on energy measured on the allocated set of subcarriers of the second CC bandwidth at subsequent start points within the allocated time-frequency resource after the second LBT operation based on energy measured on the allocated set of subcarriers of the first CC bandwidth succeeds; and in response to one of the LBT operations that are based on energy measured on the allocated set of subcarriers of the first CC bandwidth succeeding, transmitting a second uplink transmission on the allocated set of subcarriers of the second CC bandwidth within a second remaining portion of the allocated time-frequency resource. In such embodiments, the second uplink transmission may include a second activation signal to indicate a start of the second uplink transmission, and second uplink payload data.

According to a first aspect, the present disclosure provides an Electronic Device (ED) that includes one or more processors; and a non-transitory computer readable storage medium storing programming for execution by the one or more processors, the programming including instructions to: receive an uplink grant message from a base station, the uplink grant message indicating a time-frequency resource allocated to the ED for uplink transmission in an unlicensed spectrum band; perform a first listen-before-talk (LBT) operation for the allocated time-frequency resource; and perform a second LBT operation within the allocated time-frequency resource.

In some embodiments of the ED according to the second aspect of the present disclosure, the programming further includes instructions to: perform the second LBT operation at a start time based on a start point configuration within the allocated time-frequency resource; and in response to the second LBT operation succeeding, transmit an uplink transmission within a remaining portion of the allocated time-frequency resource, the uplink transmission comprising: an activation signal to indicate a start of the uplink transmission; and uplink payload data.

In some embodiments of the ED according to the second aspect of the present disclosure, the start point configuration indicates the configuration of a plurality of possible start points of uplink transmission within a subframe.

In some embodiments of the ED according to the second aspect of the present disclosure, each start point is either at an OFDM symbol boundary or midway between adjacent OFDM symbol boundaries, within the allocated time-frequency resource.

In some embodiments of the ED according to the second aspect of the present disclosure, the instructions to perform a second LBT operation within the allocated time-frequency resource comprises instructions to perform an LBT operation at each of a plurality of start times based on the start point configuration until one of the LBT operations succeeds.

In some embodiments of the ED according to the second aspect of the present disclosure, the instructions to transmit an uplink transmission within a remaining portion of the allocated time-frequency resource comprises instructions to transmit the activation signal at a start point that is part of a pre-configured subset of possible start points within the allocated time-frequency resource.

In some embodiments of the ED according to the second aspect of the present disclosure, the activation signal is selected by the ED from among a plurality of activation signals associated with the ED. In such embodiments, the plurality of activation signals may include a first activation signal to indicate that uplink transmission started at a start point that preceded the start point at which the first activation signal is transmitted, and a second activation signal to indicate that uplink transmission started at or after the start point at which the first activation signal is transmitted.

In some embodiments of the ED according to the second aspect of the present disclosure: the ED is allocated a subset of subcarriers of a component carrier (CC) bandwidth; the second LBT operation is a wideband LBT operation that is based on energy measured on all of the subcarriers of the CC bandwidth during one or more OFDM symbol intervals immediately preceding a start point within the allocated time-frequency resource; and the instructions to transmit the uplink transmission comprises instructions to transmit the uplink transmission on the allocated subset of subcarriers within the remaining portion of the allocated time-frequency resource with one or more blanking intervals based on the start point configuration.

In some embodiments of the ED according to the second aspect of the present disclosure: the ED is allocated a subset of subcarriers of a component carrier (CC) bandwidth; the second LBT operation is a narrowband LBT operation that is based on energy measured on the allocated subset of subcarriers during one or more OFDM symbol intervals immediately preceding a start point within the allocated time-frequency resource; and the instructions to transmit the uplink transmission comprises instructions to transmit the uplink transmission on the allocated subset of subcarriers within the remaining portion of the allocated time-frequency resource.

In some embodiments of the ED according to the second aspect of the present disclosure: the ED is allocated an interlace of a plurality of subsets of subcarriers of the CC bandwidth, the subsets of subcarriers of the interlace being distributed within the CC bandwidth; the second LBT operation is one of a plurality of second LBT operations that are respectively based on energy measured on a respective one of the subsets of subcarriers of the CC bandwidth during one or more OFDM symbol intervals immediately preceding the start point within the allocated time-frequency resource; and the instructions to transmit the uplink transmission comprises instructions to transmit, within the remaining portion of the allocated time-frequency resource, an uplink transmission on one or more of the allocated subsets of subcarriers for which the respective narrowband LBT procedure was successful.

According to an aspect of the present disclosure, there is provided a method for an Electronic Device (ED) in a wireless network, the method comprising: receiving an uplink grant message from a base station, the uplink grant message indicating a time-frequency resource allocated to the ED for uplink transmission in an unlicensed spectrum band; after a first listen-before-talk (LBT) operation for the allocated time-frequency resource fails, performing a second LBT operation within the allocated time-frequency resource at a start time based on a start point configuration within the allocated time-frequency resource; in response to the second LBT operation succeeding, transmitting an uplink transmission within a remaining portion of the allocated time-frequency resource, the uplink transmission comprising: an activation signal to indicate a start of the uplink transmission; and uplink payload data.

Embodiments of the above aspect of the present disclosure may include any one or more of the following:

wherein the start point configuration indicates the configuration of a plurality of possible start points of uplink transmission within a subframe;

wherein each start point is either at an OFDM symbol boundary or midway between adjacent OFDM symbol boundaries, within the allocated time-frequency resource;

further comprising receiving, from the base station, information indicating the start point configuration;

wherein the activation signal is a demodulation reference signal (DMRS);

wherein transmitting an uplink transmission within the remaining portion of the allocated time-frequency resource comprises transmitting the uplink transmission with one or more blanking intervals within the remaining portion of the allocated time-frequency resource based on the start point configuration;

wherein performing a second LBT operation within the allocated time-frequency resource comprises performing an LBT operation at each of a plurality of start times based on the start point configuration until one of the LBT operations succeeds;

wherein the second LBT operation is performed during one or more orthogonal frequency division multiplexing (OFDM) symbol intervals immediately preceding a start point within the allocated time-frequency resource;

further comprising, in response to the second LBT operation succeeding, transmitting a reservation signal between the start point of uplink transmission and the closest OFDM symbol boundary after the start point;

wherein transmitting an uplink transmission within a remaining portion of the allocated time-frequency resource comprises transmitting the activation signal at a start point that is part of a pre-configured subset of possible start points within the allocated time-frequency resource;

wherein the pre-configured subset of possible start points includes every second possible start point for uplink transmission within the allocated time-frequency resource;

wherein the activation signal is selected by the ED from among a plurality of activation signals associated with the ED, the plurality of activation signals comprising: a first activation signal to indicate that uplink transmission started at a start point that preceded the start point at which the first activation signal is transmitted; and a second activation signal to indicate that uplink transmission started at or after the start point at which the first activation signal is transmitted;

wherein the ED configures a transport block size for the uplink payload data based on a size of the remaining portion of the allocated time-frequency resource;

wherein transmitting the uplink transmission comprises: using packet segmentation to generate the uplink payload data based on the adjusted transport block size;

wherein: uplink transmissions for different transport block sizes corresponding to different start points are generated in advance of the first possible start point of uplink transmission for the allocated time-frequency resource; and transmitting the uplink transmission comprises transmitting the uplink transmission for the transport block size corresponding to the start point of the uplink transmission;

wherein the ED uses rate matching or puncturing to fit a transport block into the remaining portion of the allocated time-frequency resource without changing the transport block size;

wherein: the ED is allocated a subset of subcarriers of a component carrier (CC) bandwidth; the second LBT operation is a wideband LBT operation that is based on energy measured on all of the subcarriers of the CC bandwidth during one or more OFDM symbol intervals immediately preceding a start point within the allocated time-frequency resource; and transmitting the uplink transmission comprises transmitting the uplink transmission on the allocated subset of subcarriers within the remaining portion of the allocated time-frequency resource with one or more blanking intervals based on the start point configuration;

wherein: the ED is allocated a subset of subcarriers of a component carrier (CC) bandwidth; the second LBT operation is a narrowband LBT operation that is based on energy measured on the allocated subset of subcarriers during one or more OFDM symbol intervals immediately preceding a start point within the allocated time-frequency resource; and transmitting the uplink transmission comprises transmitting the uplink transmission on the allocated subset of subcarriers within the remaining portion of the allocated time-frequency resource;

wherein the first LBT operation is a wideband LBT operation that is based on energy measured on all of the subcarriers of the CC bandwidth during one or more OFDM symbol intervals immediately preceding or immediately after a sub-frame boundary of the time-frequency resource;

wherein the allocated subset of subcarriers correspond to the subcarriers of a physical resource block (PRB) within the allocated time-frequency resource;

wherein transmitting an uplink transmission comprises transmitting the activation signal and/or a demodulation reference signal on the first one or more OFDM symbol intervals after start point within the remaining portion of the allocated time-frequency resource;

wherein transmitting an uplink transmission comprises: transmitting the activation signal on the first one or more OFDM symbol intervals of a first start point after the second LBT operation is successful; and transmitting a demodulation reference signal on the last one or more OFDM symbol intervals of a subframe at the end of the allocated time-frequency resource;

wherein the activation signal is sparse in the frequency domain;

wherein: the ED is allocated a set of subcarriers of a first component carrier (CC) bandwidth; the first and second LBT operations are based on energy measured on the allocated set of subcarriers of the first CC bandwidth; transmitting the uplink transmission comprises transmitting a first uplink transmission on the allocated set of subcarriers of the first CC bandwidth within a first remaining portion of the allocated time-frequency resource; the ED is allocated a set of subcarriers of a second CC bandwidth that is non-overlapping with the first CC bandwidth; and the operations further comprises performing LBT operations that are based on energy measured on the allocated set of subcarriers of the second CC bandwidth at the same time that the LBT operations that are based on energy measured on the allocated set of subcarriers of the first CC bandwidth are performed;

further comprising: continuing to perform LBT operations that are based on energy measured on the allocated set of subcarriers of the second CC bandwidth at subsequent start points within the allocated time-frequency resource after the second LBT operation based on energy measured on the allocated set of subcarriers of the first CC bandwidth succeeds; and in response to one of the LBT operations that are based on energy measured on the allocated set of subcarriers of the first CC bandwidth succeeding, transmitting a second uplink transmission on the allocated set of subcarriers of the second CC bandwidth within a second remaining portion of the allocated time-frequency resource, the second uplink transmission comprising: a second activation signal to indicate a start of the second uplink transmission; and second uplink payload data;

wherein: there is a predefined mapping between code blocks of data and start point within the allocated time-frequency resource; and the uplink payload data that is transmitted as part of the uplink transmission includes the code blocks of data that are mapped to start points within the remaining portion of the allocated time-frequency resource; and wherein: there is a predefined mapping between code blocks of data and start points within the allocated time-frequency resource; and the uplink payload data that is transmitted as part of the uplink transmission includes a sequence of code blocks of data starting with the code block mapped to the first start point of the allocated time-frequency resource.

According to another aspect of the present disclosure, there is provided a UE configured to implement the method according to the above aspect of the present disclosure.

According to another aspect of the present disclosure, there is provided a method for a base station in a wireless network, the method comprising: transmitting a first uplink grant message for a first electronic device (ED), the first uplink grant message indicating a time-frequency resource allocated to the first ED for uplink transmission in an unlicensed spectrum band; monitoring for detection of an activation signal associated with the first ED at start times based on a start point configuration within the allocated time-frequency resource until either the activation signal associated with the first ED is detected or the allocated time-frequency resource ends, the activation signal associated with the first ED indicating a start of uplink transmission from the first ED; and in response to detecting the activation signal associated with the first ED, decoding uplink payload data for the first ED received by the base station between the start of uplink transmission from the first ED and the end of the allocated time-frequency resource.

Embodiments of the above aspect of the present disclosure may include any one or more of the following:

wherein the start point configuration indicates the configuration of a plurality of start point within a subframe;

further comprising: pre-configuring the start point configuration at the base station; and transmitting, from the base station, an information message indicating the start point configuration;

wherein the activation signal is a demodulation reference signal (DMRS) associated with the first ED and the base station uses the DMRS to decode the uplink payload data for the first ED;

wherein decoding uplink payload data for the first ED comprises decoding the uplink payload data taking into account one or more blanking intervals within the remaining portion of the allocated time-frequency resource based on the mini-slot configuration wherein monitoring for detection of the activation signal associated with the first ED comprises monitoring for detection of the activation signal associated with the first ED starting at or after each of a plurality of start point within the allocated time-frequency resource until either the activation signal associated with the first ED is detected or the allocated time-frequency resource ends;

wherein monitoring for detection of an activation signal associated with the first ED comprises monitoring for detection of the activation signal at a pre-configured subset of the possible start points for uplink transmission within the allocated time-frequency resource;

wherein the pre-configured subset of possible start points includes every second possible start point for uplink transmission within the allocated time-frequency resource;

wherein monitoring for detection of an activation signal associated with the first ED comprises monitoring for detection of a plurality of activation signals associated with the first ED, the plurality of activation signals comprising: a first activation signal to indicate that uplink transmission started at a start point that preceded the start point at which the first activation signal is transmitted; and a second activation signal to indicate that uplink transmission started at or after the start point at which the first activation signal is transmitted;

wherein decoding the uplink payload data for the first ED in response to detecting the activation signal indicating the start of uplink transmission from the first ED comprises: determining an expected transport block size for the uplink payload data based on a size of a remaining portion of the allocated time-frequency resource after the start of uplink transmission from the first ED; and decoding the uplink payload data based in part on the expected transport block size;

wherein the base station determines the expected transport block size based on a mapping between transport block sizes and possible start points for uplink transmission within the allocated time-frequency resource;

wherein decoding the uplink payload data takes into account rate matching or puncturing done by the first ED to fit a transport block into the remaining portion of the allocated time-frequency resource;

wherein: the first uplink grant message for the first ED indicates the first ED is allocated a first subset of subcarriers of a component carrier (CC) bandwidth within the time-frequency resource; monitoring for detection of an activation signal associated with the first ED comprises monitoring for the detection of the activation signal associated with the first ED on the first subset of subcarriers allocated to the first ED; and decoding uplink payload data for the first ED in response to detecting the activation signal associated with the first ED comprises decoding the uplink payload data for the first ED received by the base station on the first subset of subcarriers allocated to the first ED between the start of uplink transmission from the first ED and the end of the time-frequency resource;

further comprising: transmitting a second uplink grant message for a second ED, the second uplink grant message indicating the second ED is allocated a second subset of subcarriers of the CC bandwidth within the time-frequency resource for uplink transmission in the unlicensed spectrum band, the second subset of subcarriers being non-overlapping with the first subset of subcarriers; monitoring for detection of an activation signal associated with the second ED on the second subset of subcarriers at start times based on the start point configuration within the time-frequency resource until either the activation signal associated with the second ED is detected or the time-frequency resource ends, the activation signal associated with the second ED indicting a start of uplink transmission from the second ED; and in response to detecting the activation signal associated with the second ED, decoding uplink payload data for the second ED received by the base station on the second subset of subcarriers between the start of uplink transmission from the second ED and the end of the time-frequency resource;

wherein the allocated subsets of subcarriers correspond to the subcarriers of first and second physical resource blocks (PRBs), respectively, within the time-frequency resource;

wherein the base station decodes the uplink payload data for the first ED based in part on a demodulation reference signal transmitted by the first ED as part of the uplink transmission on the first one or more OFDM symbol intervals of each start point between the start of uplink transmission from the first ED and the end of the allocated time-frequency resource;

wherein the base station decodes the uplink payload data for the first ED based in part on a demodulation reference signal transmitted by the first ED as part of the uplink transmission on the last one or more OFDM symbol intervals of a subframe at the end of the allocated time-frequency resource;

wherein: the first uplink grant message for the first ED indicates the first ED is allocated first and second component carrier (CC) bandwidths within the time-frequency resource; monitoring for detection of an activation signal associated with the first ED comprises: monitoring for detection of a first activation signal associated with the first ED on a set of subcarriers of the first CC bandwidth, the first activation signal indicating a start of first uplink transmission from the first ED on the set of subcarriers of the first CC bandwidth; and monitoring for detection of a second activation signal associated with the first ED on a set of subcarriers of the second CC bandwidth, the second activation signal indicating a start of second uplink transmission from the first ED on the set of subcarriers of the second CC bandwidth; and decoding uplink payload data for the first ED in response to detecting the activation signal comprises at least one of: in response to detecting the first activation signal associated with the first ED on the set of subcarriers of the first CC bandwidth, decoding first uplink payload data for the first ED received by the base station on the set of subcarriers of the first CC bandwidth between the start of first uplink transmission from the first ED and the end of the allocated time-frequency resource; and in response to detecting the second activation signal associated with the first ED on the set of subcarriers of the second CC bandwidth, decoding second uplink payload data for the first ED received by the base station on the set of subcarriers of the second CC bandwidth between the start of second uplink transmission from the first ED and the end of the allocated time-frequency resource;

further comprising: transmitting a second uplink grant message for a second ED, the second uplink grant message indicating the second ED is allocated the set of subcarriers of the second CC bandwidth within the time-frequency resource for uplink transmission in the unlicensed spectrum band; monitoring for detection of an activation signal associated with the second ED on the set of subcarriers of the second CC bandwidth at start times based on the start point configuration within the time-frequency resource until either the activation signal associated with the second ED is detected or the time-frequency resource ends, the activation signal associated with the second ED indicating a start of uplink transmission from the second ED; and in response to detecting the activation signal associated with the second ED, decoding uplink payload data for the second ED received by the base station on the set of subcarriers of the second CC bandwidth between the start of uplink transmission from the second ED and the end of the time-frequency resource.

According to another aspect of the present disclosure, there is provided a base station configured to implement the method according to the above aspect of the present disclosure.

According to another aspect of the present disclosure, there is provided a non-transitory computer readable storage medium storing programming for execution by one or more processors, the programming including instructions to perform A method according to any one or more of the above aspects of the present disclosure.

According to another aspect of the present disclosure, there is provided an Electronic Device (ED) comprising: one or more processors; and a non-transitory computer readable storage medium storing programming for execution by the one or more processors, the programming including instructions to: in response to: i) receiving an uplink grant message from a base station, the uplink grant message indicating a time-frequency resource allocated to the ED for uplink transmission in an unlicensed spectrum band; and ii) after a first listen-before-talk (LBT) operation for the allocated time-frequency resource fails, perform a second LBT operation within the allocated time-frequency resource at a start time based on a start point configuration within the allocated time-frequency resource; and in response to the second LBT operation succeeding, transmit an uplink transmission within a remaining portion of the allocated time-frequency resource, the uplink transmission comprising: an activation signal to indicate a start of the uplink transmission; and uplink payload data.

According to another aspect of the present disclosure, there is provided a base station comprising: one or more processors; and a non-transitory computer readable storage medium storing programming for execution by the one or more processors, the programming including instructions to: transmit a first uplink grant message for a first electronic device (ED), the first uplink grant message indicating a time-frequency resource allocated to the first ED for uplink transmission in an unlicensed spectrum band; monitor for detection of an activation signal associated with the first ED at start times based on a start point configuration within the allocated time-frequency resource until either the activation signal associated with the first ED is detected or the allocated time-frequency resource ends, the activation signal associated with the first ED indicating a start of uplink transmission from the first ED; and in response to detecting the activation signal associated with the first ED, decode uplink payload data for the first ED received by the base station between the start of uplink transmission from the first ED and the end of the allocated time-frequency resource.

BRIEF DESCRIPTION OF THE DRAWINGS

Embodiments of the present disclosure will be described in greater detail with reference to the accompanying drawings.

DETAILED DESCRIPTION

Figure 1:
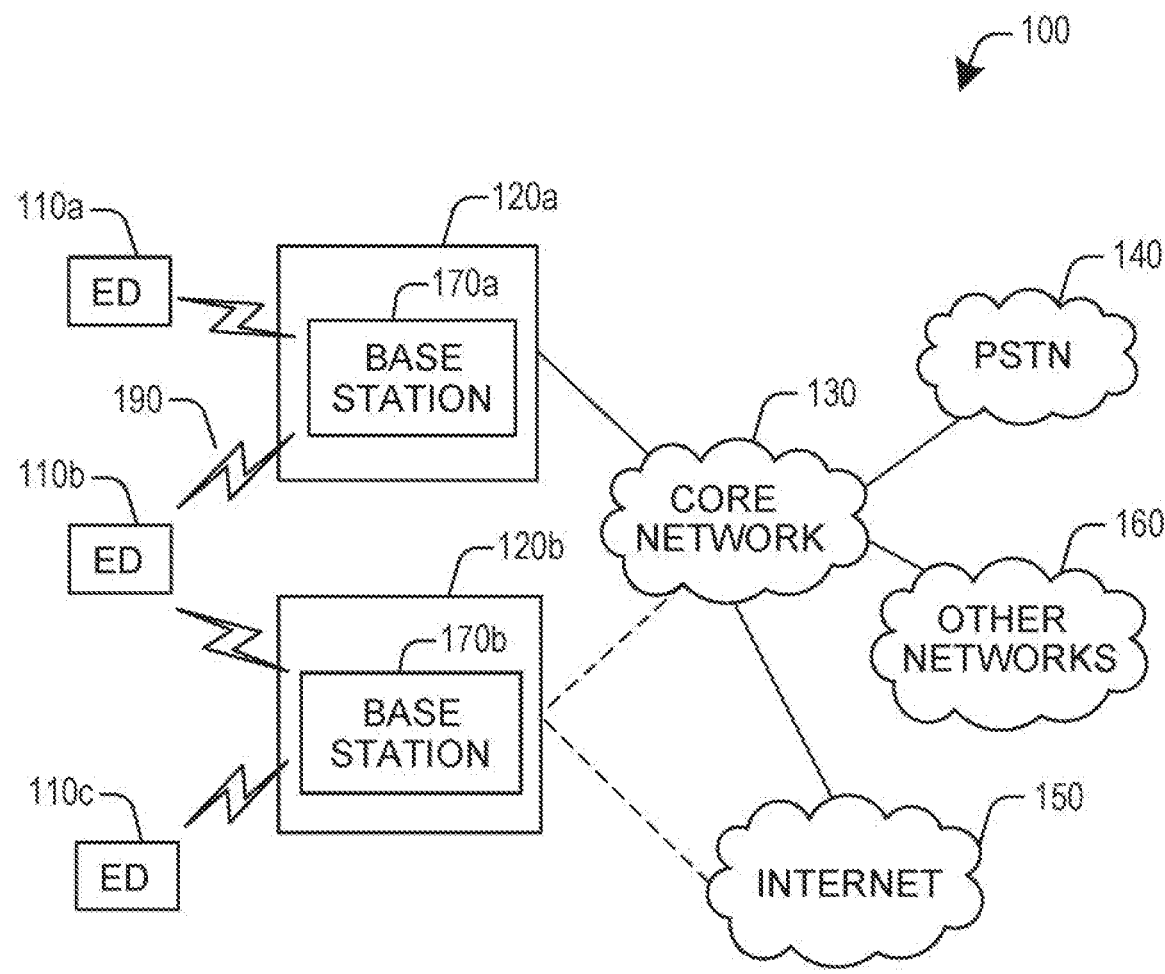
FIG. 1 is a schematic diagram of a communication system.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

As noted above, given the scarcity and expense of bandwidth in the licensed spectrum, and the increasing demand for data transmission capacity, there is increasing interest in offloading at least some communication traffic, such as uplink communication traffic, to the unlicensed spectrum. However, when an uplink transmission from an ED to a base station takes place in the unlicensed spectrum, the ED must perform a listen-before-talk (LBT) operation to make a clear channel assessment (CCA) before accessing the unlicensed spectrum in order to check that the channel is idle before transmitting. As such, even if a base station allocates a time-frequency resource in the unlicensed spectrum to an ED for uplink transmission, the ED may not be able to make an uplink transmission using the allocated time-frequency resource.

For example, in an IEEE 802.11ax WLAN, which is a type of WLAN that was designed to improve overall spectral efficiency particularly in dense deployment scenarios, an Access Point (AP) can schedule multiple EDs (referred to as stations (STAs) in IEEE 802.11ax) simultaneously transmitting in uplink either by Orthogonal Frequency Division Multiple Access (OFDMA) or Multi-User Multiple-Input-Multiple-Output (MU MIMO). The scheduled STAs in IEEE 802.11ax perform LBT operations to make a CCA within the Short Inter-Frame Space (SIFS) after a trigger frame. If the CCA fails, a STA gives up the scheduled transmission opportunity (TXOP).

Similarly, in the 3rd Generation Partnership Project (3GPP) Long Term Evolution (LTE) specification for evolved Licensed Assisted Access (eLAA) in the unlicensed spectrum, an ED (referred to as User Equipment (UE) in LTE eLAA) that has received an uplink grant message indicating that the UE has been scheduled on a subframe for uplink transmission in the unlicensed spectrum performs an LBT operation in the first OFDM symbol interval of the scheduled subframe to make a CCA. If the CCA is successful (indicating that the channel is available), then the UE can proceed with transmitting uplink transmission from the starting point indicated in the uplink grant. Otherwise, if the CCA fails (indicating that the channel is busy/unavailable), the UE gives up the whole subframe. Thus the failure of the single LBT operation at the beginning of the subframe boundary of the scheduled subframe causes the UE to waste the whole subframe.

Systems and methods for grant-based uplink transmission in unlicensed spectrum are provided that may mitigate one or more of the disadvantages of the approaches described above. For example, some aspects of the present disclosure provide mechanisms for EDs to perform LBT operations and start uplink transmissions other than only at subframe boundaries. These mechanisms can provide multiple opportunities for scheduled UEs to contend for a transmission opportunity within a time-frequency resource that they have been allocated for uplink transmission in the unlicensed spectrum. The multiple opportunities mean that the entire allocated time-frequency resource does not have to be wasted after a single failed LBT operation, which may reduce resource waste in unlicensed spectrum operation.

Turning now to the figures, some specific example embodiments will be described.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Embodiments of the present disclosure provide a grant-based transmission mode for uplink transmissions in an unlicensed spectrum.

From the network perspective, a base station, such as an eNB or gNB, may pre-configure one or more start points within UL slot(s)/subframe(s). For example, the start points can include slot/subframe boundaries, any OFDM symbol boundaries within the slot/subframe, or possibly points between OFDM symbol boundaries, as discussed in further detail below with reference to FIGS. 3A and 3B. The base station may then provide the one or more start points to EDs, e.g., via control signaling in the licensed spectrum or unlicensed spectrum. The base station may then allocate an uplink resource in the unlicensed spectrum to an ED in terms of slot(s)/subframe(s) in the time domain. For example, the base station may indicate the allocation to the ED by transmitting an uplink grant message to the ED. The base station may transmit such an uplink grant message in response to receiving an uplink scheduling request message from the ED. As discussed in further detail below, EDs are configured to transmit an activation signal to indicate the start of uplink transmission. The base station monitors for detection of potential activation signals from the scheduled ED at the min-slot and slot/subframe boundaries within the allocated resource until either the base station successfully detects the activation signal associated with the ED or the allocated resource has ended. If the base station detects the activation signal associated with a scheduled ED within the allocated resource, the base station attempts to decode the uplink payload data from the scheduled ED from transmissions received by the base station between the start of uplink transmission from the scheduled ED and the end of the allocated resource.

From the ED perspective, an ED may transmit an uplink scheduling request to a base station. The uplink scheduling request may be transmitted over either the licensed spectrum or unlicensed spectrum, for example. In response to the uplink scheduling request, the ED may receive an uplink grant message from the base station indicating a time-frequency resource allocated to the ED for uplink transmission in an unlicensed spectrum band. In some embodiments, the ED may also receive potential start point(s) from the base station. In other embodiments, the ED may have been previously configured with one or more start points. In response to receiving the uplink grant message, the ED may perform an LBT operation at the potential start point(s) within the allocated resource based on the configuration of potential start point(s). For example, if an LBT operation at a slot/subframe boundary fails, the ED may perform another LBT operation at the next start point within the slot/subframe. If the LBT operation at next start point fails, the ED may perform an LBT operation within one or more OFDM symbol intervals within the mini-slot and/or at the boundary of a subsequent mini-slot within the slot/subframe. The ED may continue to perform LBT operations at subsequent times within the allocated resource until either an LBT operation is successful or the allocated resource has ended. If an LBT operation is successful, the ED transmits an uplink transmission within a remaining portion of the allocated resource. The uplink transmission includes an activation signal and uplink payload data. The activation signal is transmitted by the ED to indicate the start of its uplink transmission. The payload data may be transmitted before, after or together with the activation signal, as discussed in further detail below with reference to FIGS. 2A and 2B. In some embodiments, the ED may reuse a demodulation reference signal (DMRS) within the allocated resource as its activation signal. In general, the activation signal may be any ED-specific signal to indicate the start of uplink transmission to the base station. In some embodiments, the uplink transmission transmitted by the ED may be transmitted with one or more blanking intervals to avoid potential interference with the LBT operations of other EDs, as discussed in further detail below.

Figure 2A:
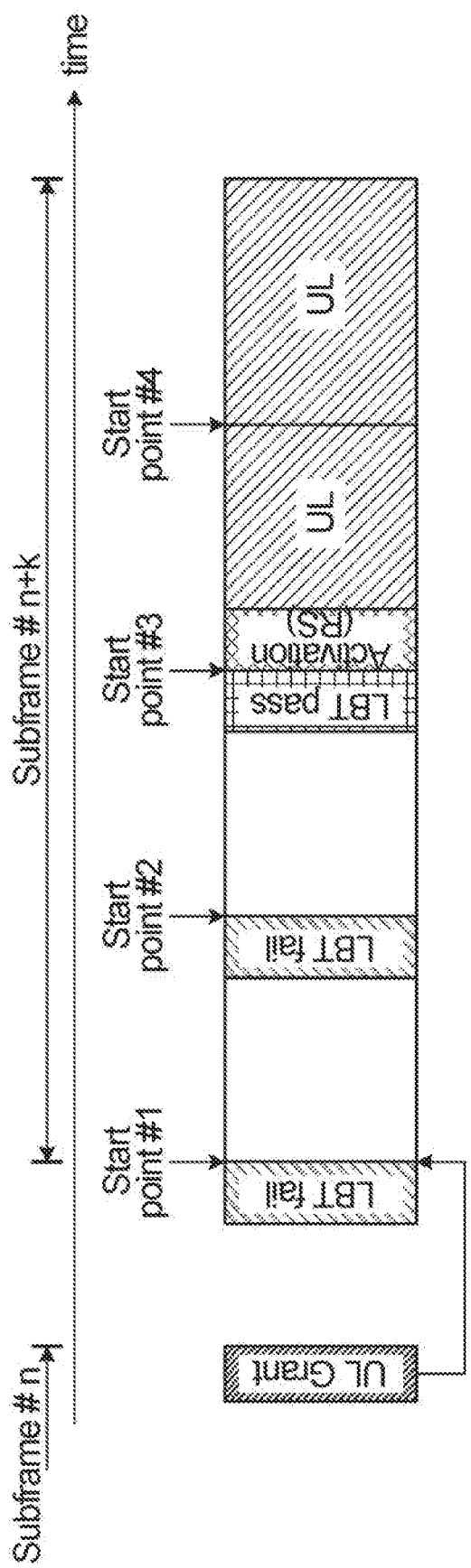
FIGS. 2A, 2B and 2C are timing diagrams showing examples of an unlicensed spectrum band access procedure by an ED for grant-based uplink transmission in accordance with an embodiment of the present disclosure.
Figure 2B:
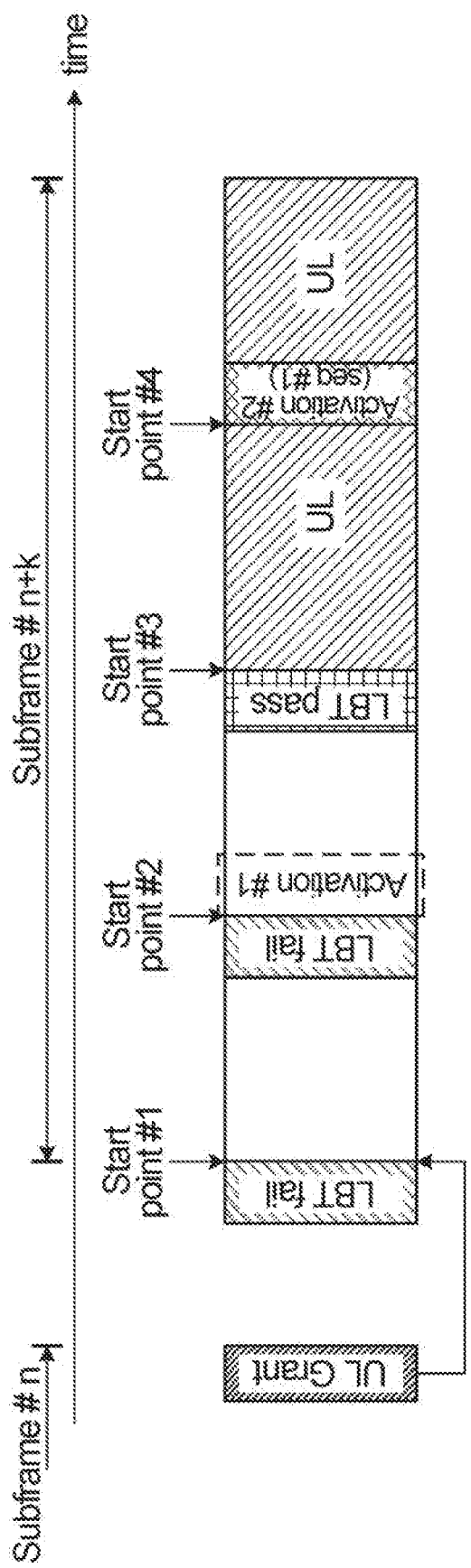

FIGS. 2A and 2B are timing diagrams showing two examples of an unlicensed spectrum band access procedure by an ED to access an allocated time-frequency resource in an unlicensed spectrum band for grant-based uplink transmission in accordance with an embodiment of the present disclosure. In particular, in FIG. 2A, a base station transmits in downlink (DL) subframe #n an uplink (UL) grant for the uplink subframe #n+k. The uplink subframe #n+k includes four start points #1-4. The ED performs an LBT operation at the boundary of subframe #n+k (which is also start point #1) and the start points #2 and #3. In this example, the LBT operation fails at the boundaries of subframe #n+k and start point #2 and passes at the start point #3.

In response to the LBT operation at the start point #3 succeeding, the ED begins transmitting an uplink transmission from start point #3. The uplink transmission includes an activation signal to indicate the start of the uplink transmission, and uplink payload data. The activation signal is transmitted within the unlicensed spectrum time-frequency resource allocated to the ED. In some embodiments, the ED may transmit a reservation signal (not shown in FIGS. 2A and 2B) within the allocated time-frequency resource between the end of the successful LBT and the transmission of the activation signal. The reservation signal is intended to prevent other devices from accessing the time-frequency resource the base station has allocated to the ED. For example, in some embodiments a cyclic prefix (CP) extension of a following OFDM symbol is transmitted as the reservation signal. Transmitting the CP extension of the following OFDM symbol as the reservation signal may also mitigate inter symbol interference.

The ED transmits the uplink transmission until the end of the allocated resource. In some embodiments, the ED will adjust the transport block (TB) size used to transmit uplink traffic based on the amount of the allocated resource that remains after the successful LBT operation. The transmissions for different TB sizes corresponding to different start points can be prepared in advance in order to satisfy the short latency between the end of LBT and start of transmission. For example, if the LBT operation at the subframe boundary of subframe #n+k was successful, the ED may use a different TB size than if an LBT operation does not succeed until the start point #3. In such embodiments, the base station performs a similar operation to configure an expected TB size to use in decoding the uplink payload data received from the ED. In some embodiments, the ED may use rate matching or puncturing to fit the original TB into the accessible resource without changing the TB size. In some embodiments, the ED may use packet segmentation to generate the uplink payload data to fit within the remaining portion of the allocated resource. The ED may transmit an updated buffer status report (BSR) as part of the uplink transmission to advise the base station of its updated buffer status due to the packet segmentation.

In FIG. 2B, the base station can determine the start point of uplink transmission from one or multiple pre-configured locations. If the uplink transmission starts from start points #1 or #2, the base station will detect an activation signal at the location of activation #1. Different sequences on the signals indicate whether the transmission began at start point #1 or #2. The start point #3 and #4 are indicated at the location of activation #2. The sequences are used to further distinguish start points #3 and #4.

In the examples shown in FIGS. 2A and 2B, the LBT operations are shown as being within the OFDM symbol intervals that immediately precede the subframe boundary and start points. More generally, as discussed in further detail below with reference to FIGS. 3A-3B, LBT operations can occupy one or more OFDM symbol intervals immediately before subframe/slot/mini-slot boundaries or one or more symbol intervals within the corresponding subframe/slot/mini-slot.

In some embodiments, an ED may be allocated an UL resource based on an interlace of physical resource blocks (PRBs) distributed within a channel bandwidth. In such embodiments, an activation signal may be transmitted on each of the plurality of PRBs of the interlace allocated to the ED. Regulations relating to unlicensed spectrum access may require that transmissions made within a given channel bandwidth satisfy a minimum occupancy channel bandwidth. By allocating an ED a plurality of PRBs distributed within a channel bandwidth, it is possible to satisfy the minimum occupancy channel bandwidth of such regulations.

Figure 2C:
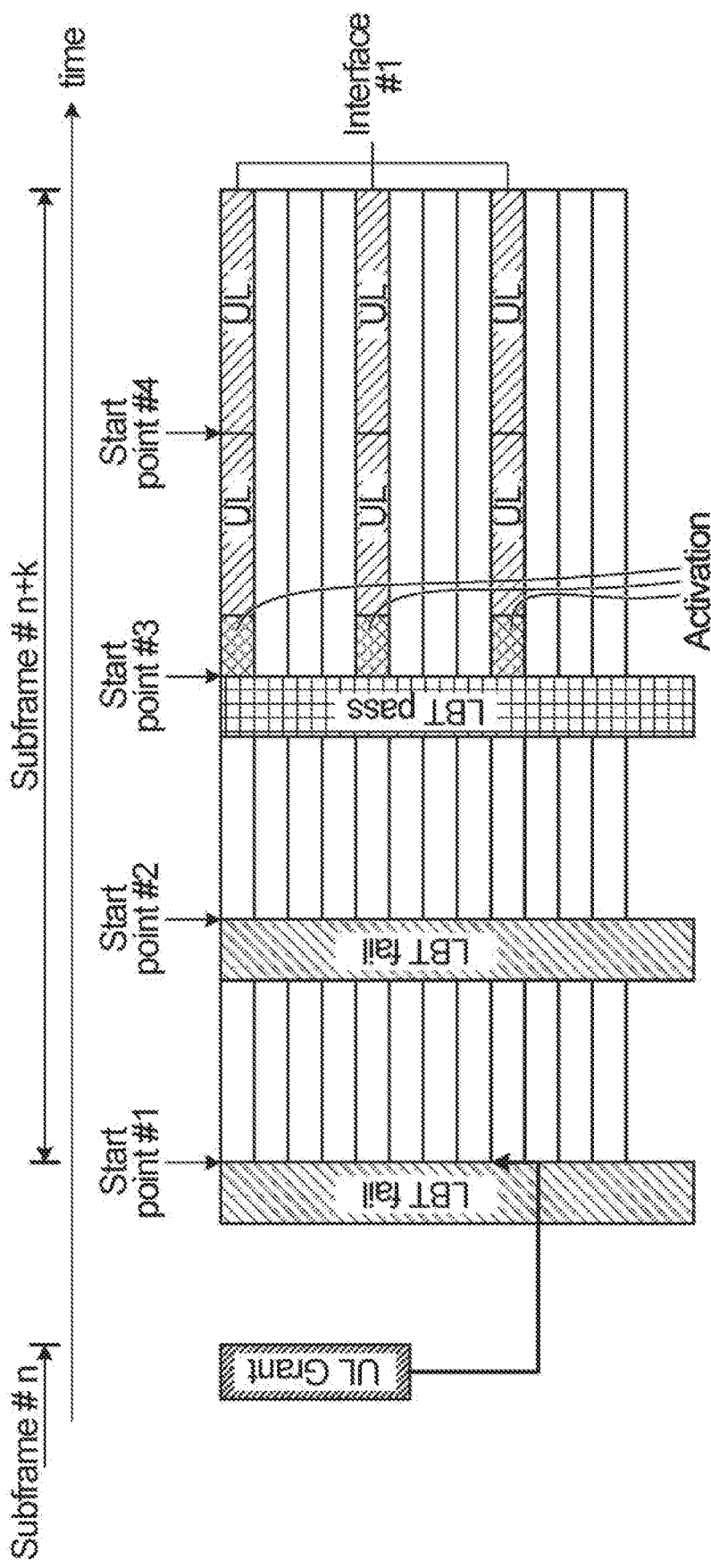

FIG. 2C is a timing diagram showing an example of an unlicensed spectrum band access procedure by an ED to access a time-frequency resource in an unlicensed spectrum band for grant-based uplink transmission. The time-frequency resource allocated to the ED includes an interlace, Interlace #1, of PRBs. As shown in FIG. 2C, an activation signal is transmitted by the ED only on the PRBs of the allocated interlace.

Figure 3A:
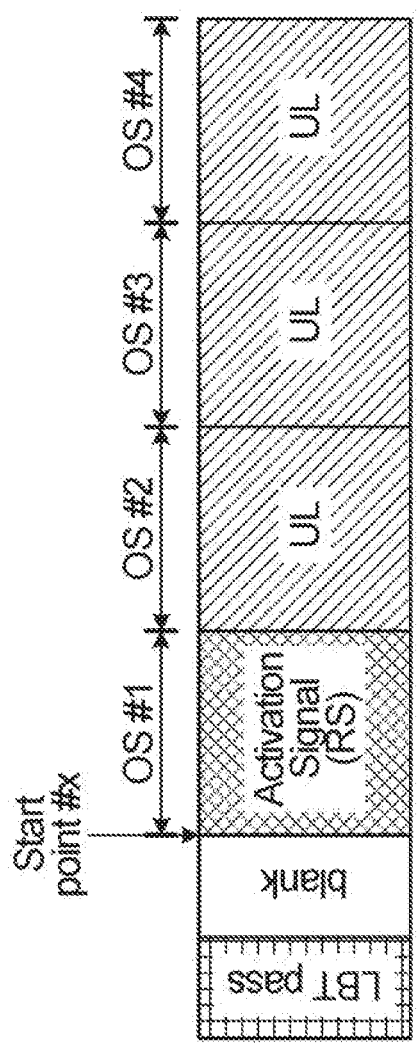
FIGS. 3A and 3B are timing diagrams showing two examples of the timing of LBT operations relative to a mini-slot boundary in accordance with an embodiment of the present disclosure.
Figure 3B:
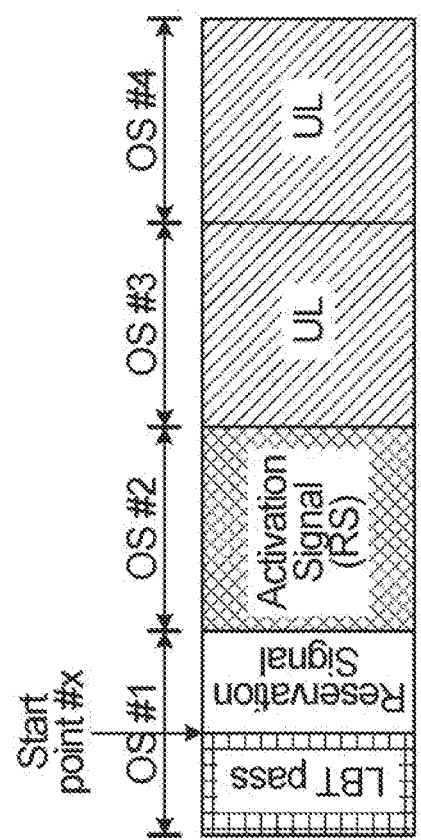

FIGS. 3A and 3B are timing diagrams showing two examples of the timing of LBT operations relative to start point in accordance with an embodiment of the present disclosure.

In FIG. 3A, the start point is at the OFDM symbol boundary. the LBT operation occupies time intervals immediately before the start point. As noted above, and shown in FIG. 3A, in some embodiments an ED may keep the rest of symbol duration blank between the end of a successful LBT operation and the beginning of uplink transmission.

In FIG. 3B, rather than being at the OFDM symbol boundary, the start point is located at a point after the OFDM symbol boundary such that it is located between OFDM symbol boundaries. The LBT operation occupies an LBT time interval immediately before the start point. As shown in FIG. 3B, the activation signal or DMRS starts at the first OFDM symbol boundary after the LBT operation passes at the start point. The ED may transmit a reservation signal for the remainder of OFDM symbol (OS) OS #1 before starting uplink transmission in the second OS interval (OS #2) of the mini-slot. In some embodiments, the reservation signal may be a CP extension of the next OFDM symbol.

Figure 4A:
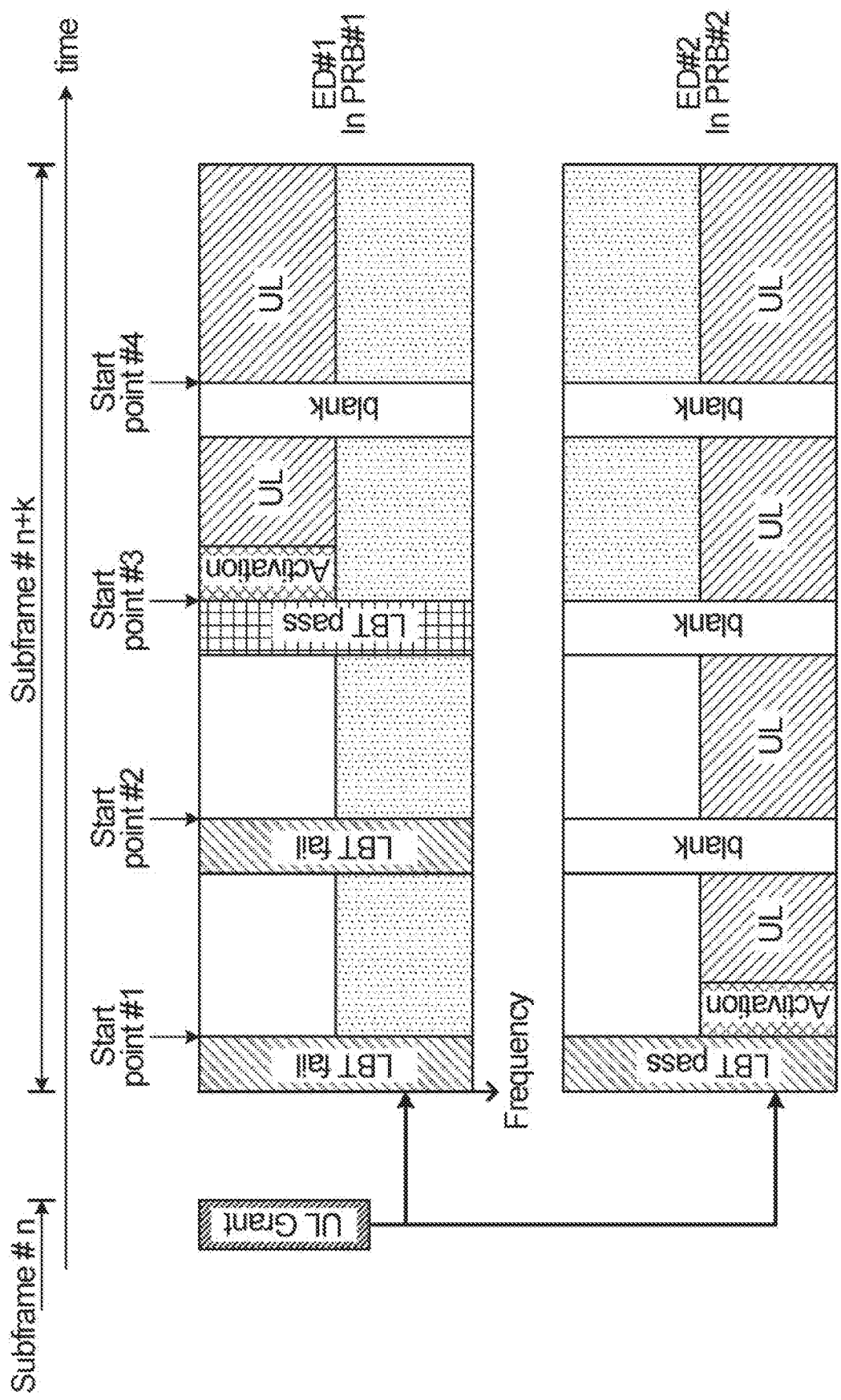
FIGS. 4A, 4B and 4C are timing diagrams showing examples of an unlicensed spectrum band access procedure by an ED for grant-based uplink transmission that supports frequency domain multiplexing in accordance with an embodiment of the present disclosure.
Figure 4B:
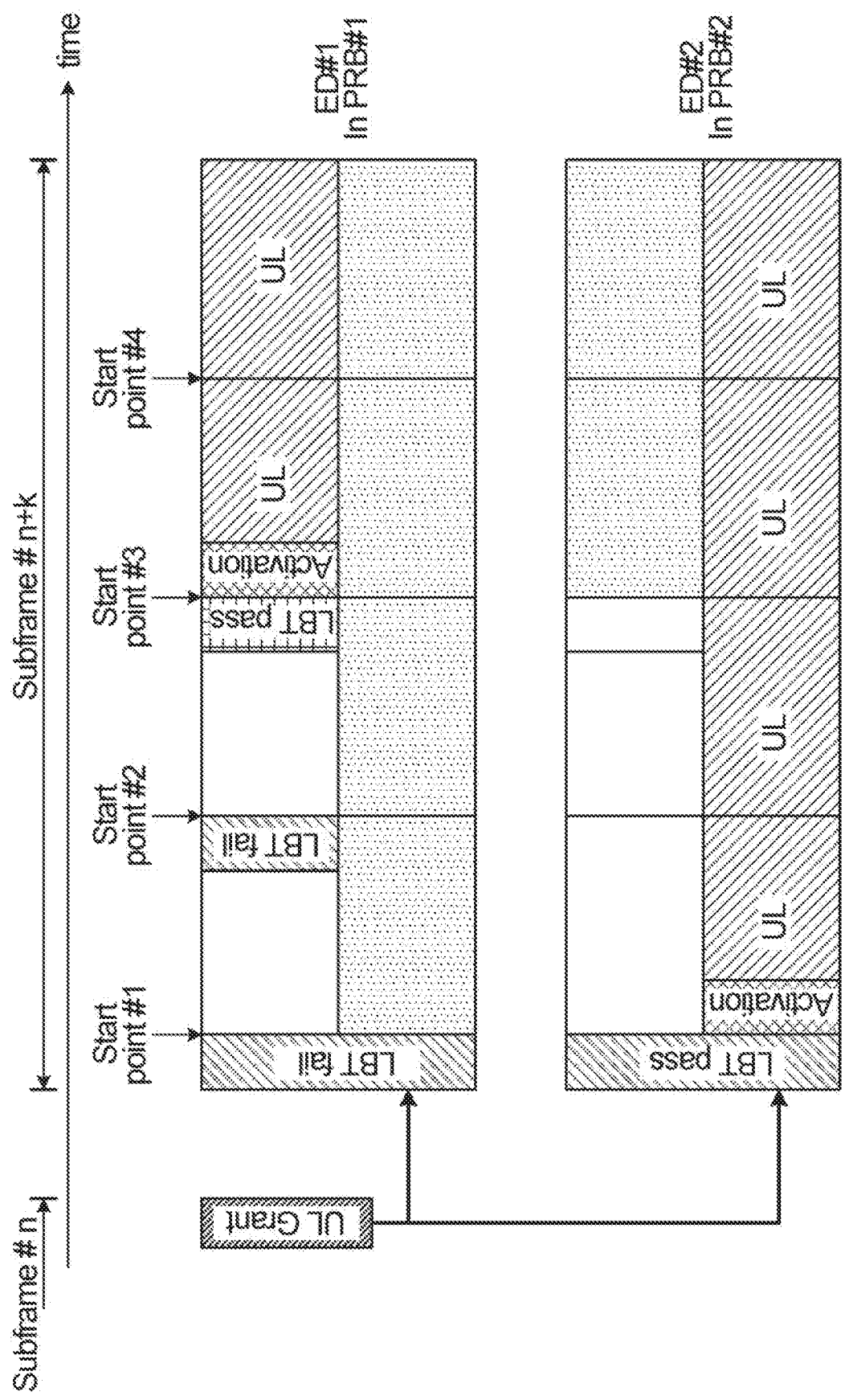

FIGS. 4A and 4B are timing diagrams showing examples of an unlicensed spectrum band access procedure by an ED for grant-based uplink transmission that supports frequency domain multiplexing in accordance with an embodiment of the present disclosure.

In FIG. 4A, frequency domain multiplexing of uplink transmissions from different EDs is supported by performing wideband LBT operations at the subframe boundary and at potential start points within the subframe. In this example, two EDs (ED #1 and ED #2) are allocated non-overlapping physical resource blocks (PRB #1 and PRB #2), virtual resource blocks or interlaces. Each of the PRBs includes a respective subset of the subcarriers of a component carrier (CC) bandwidth, e.g. a respective subset of the subcarriers within a 20 MHz CC bandwidth. An interlace includes multiple resource blocks distributed within the component carrier (CC) or bandwidth part (BWP). The bandwidth of CC or BWP can be larger than a unit bandwidth defined in the channelization, e.g. 20 MHz. The wideband LBT operations at the subframe boundary and potential start points within the subframe are based on energy measured on all of the subcarriers of the CC bandwidth during the time period conforming to regulation. For example, the wideband LBT operations may measure the energy of CC/system bandwidth according to the Category 2 (CAT2—LBT without random back-off) or Category 4 (CAT4—LBT with random back-off with variable size of contention window or extended CCA) LBT procedures defined for LTE license assisted access.

In FIG. 4A, after each ED completes a successful LBT operation and begins uplink transmission, the ED transmits its uplink transmission with blanking intervals immediately before each of the subsequent start points in order to avoid having its uplink transmission act as interference to the potential LBT operations of other EDs that may be scheduled in the same time-frequency resource. For example, the uplink transmission transmitted by ED #2 after its successful LBT operation at the boundary of subframe #n+k includes blanking intervals immediately before the start points #2, #3 and #4.

In FIG. 4B, frequency domain multiplexing of uplink transmissions from different EDs is supported by performing a wideband LBT operation at a slot/subframe boundary and narrow band LBT operations at the start points within the duration of a slot or subframe. Similar to the example shown in FIG. 4A, in the example shown in FIG. 4B two EDs (ED #1 and ED #2) are allocated non-overlapping physical resource blocks (PRB #1 and PRB #2) that each include a respective subset of the subcarriers of a CC bandwidth. However, unlike the example shown in FIG. 4A, in the example shown in FIG. 4B the LBT operations that are performed immediately before the start points #2, 3 and 4 within subframe #n+k are narrowband LBT operations that are based on energy measured only on the respective subset of subcarriers allocated to the ED. The duration of a narrow band LBT operation is equal to and aligned with one OFDM symbol interval.

Figure 4C:
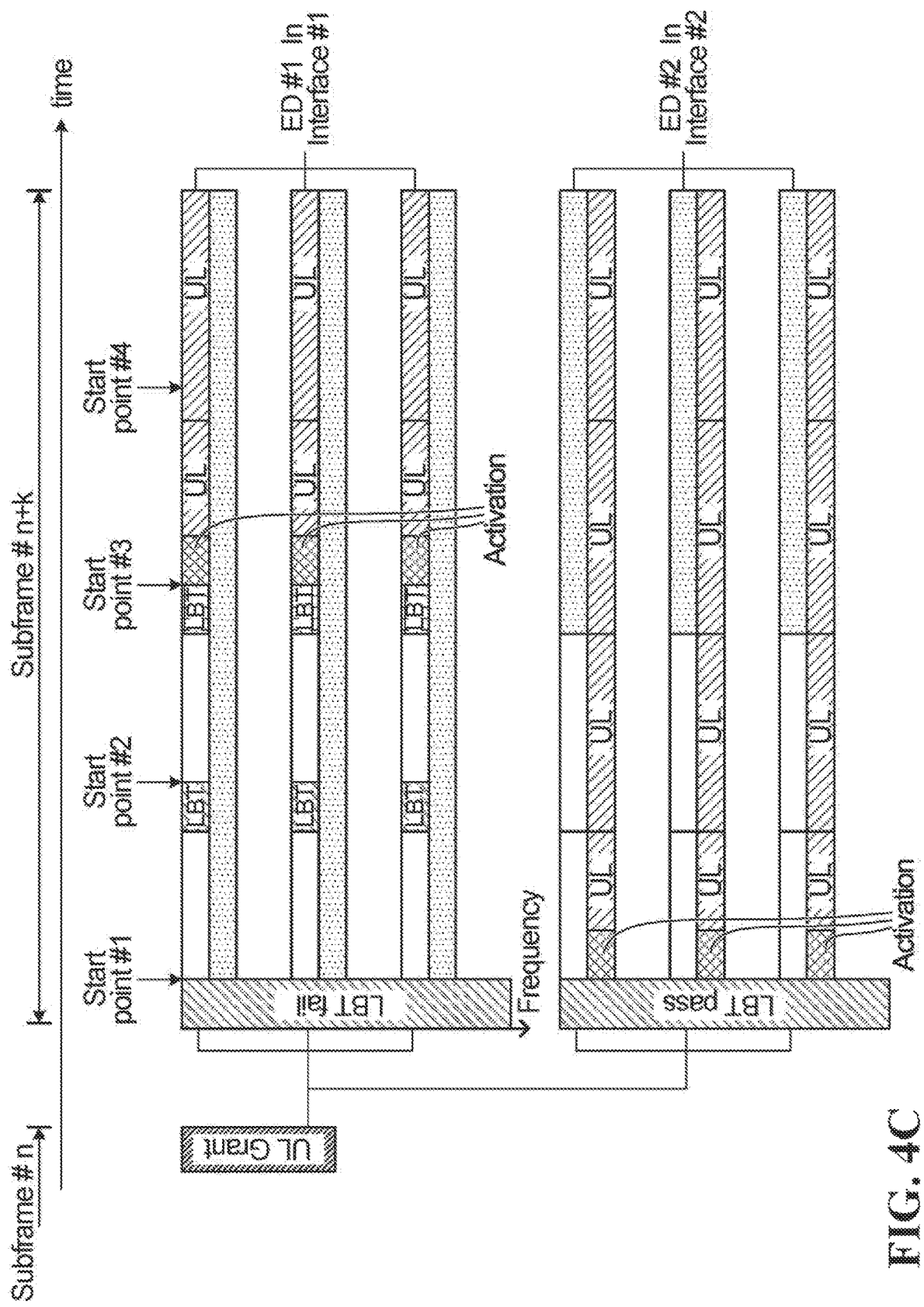

In FIG. 4C, two EDs (ED #1 and ED #2) are allocated non-overlapping interlaces (Interlace #1 and Interlace #2) that each include a plurality of PRBs distributed within a CC or BWP. In the example shown in FIG. 4C the LBT operations that are performed immediately before the start points #2, 3 and 4 within subframe #n+k are narrowband LBT operations that are based on energy measured only on the respective PRBs of the interlace allocated to the ED.

In FIGS. 4A, 4B and 4C, the wideband and narrowband LBT operations occur before the start points in the slot/subframe. The start point may start at the OFDM symbol boundary or in the middle of OFDM symbol duration. The term "wideband LBT" is used herein to refer to an LBT procedure in which an ED performs LBT on the channel bandwidth of a component carrier or bandwidth part in which the UL resource is scheduled, whereas the term "narrowband LBT" is used herein to refer to an LBT procedure in which the bandwidth of the LBT performed by the ED is narrower than the full channel bandwidth of a component carrier or bandwidth part in which the UL resource is scheduled, e.g., a bandwidth equal to the frequency resource allocated to the ED.

Figure 5A:
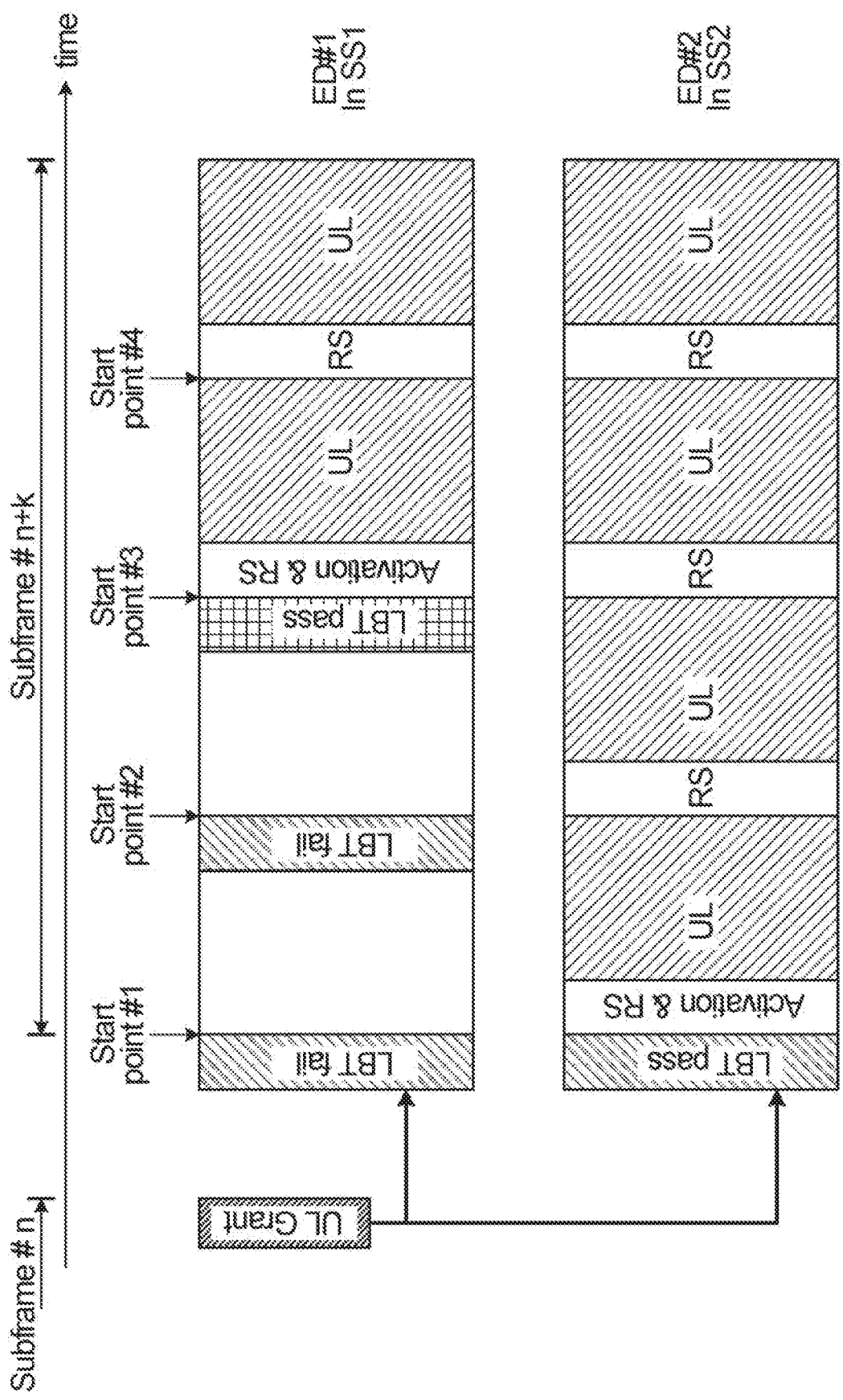
FIGS. 5A, 5B and 5C are timing diagrams showing examples of an unlicensed spectrum band access procedure by an ED for grant-based uplink transmission that support uplink Multi-User Multiple-Input-Multiple-Output in accordance with an embodiment of the present disclosure.
Figure 5B:
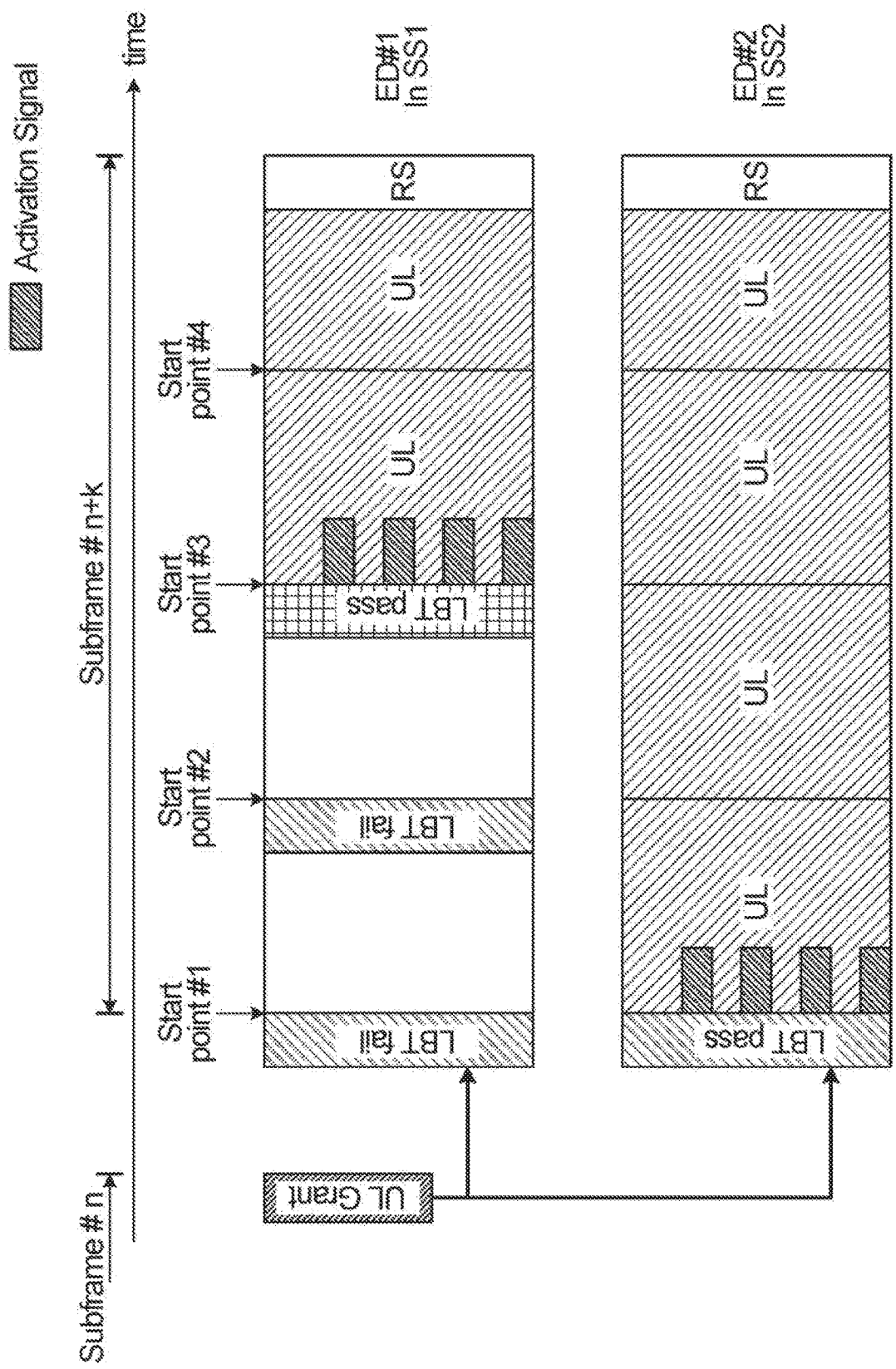
Figure 5C:
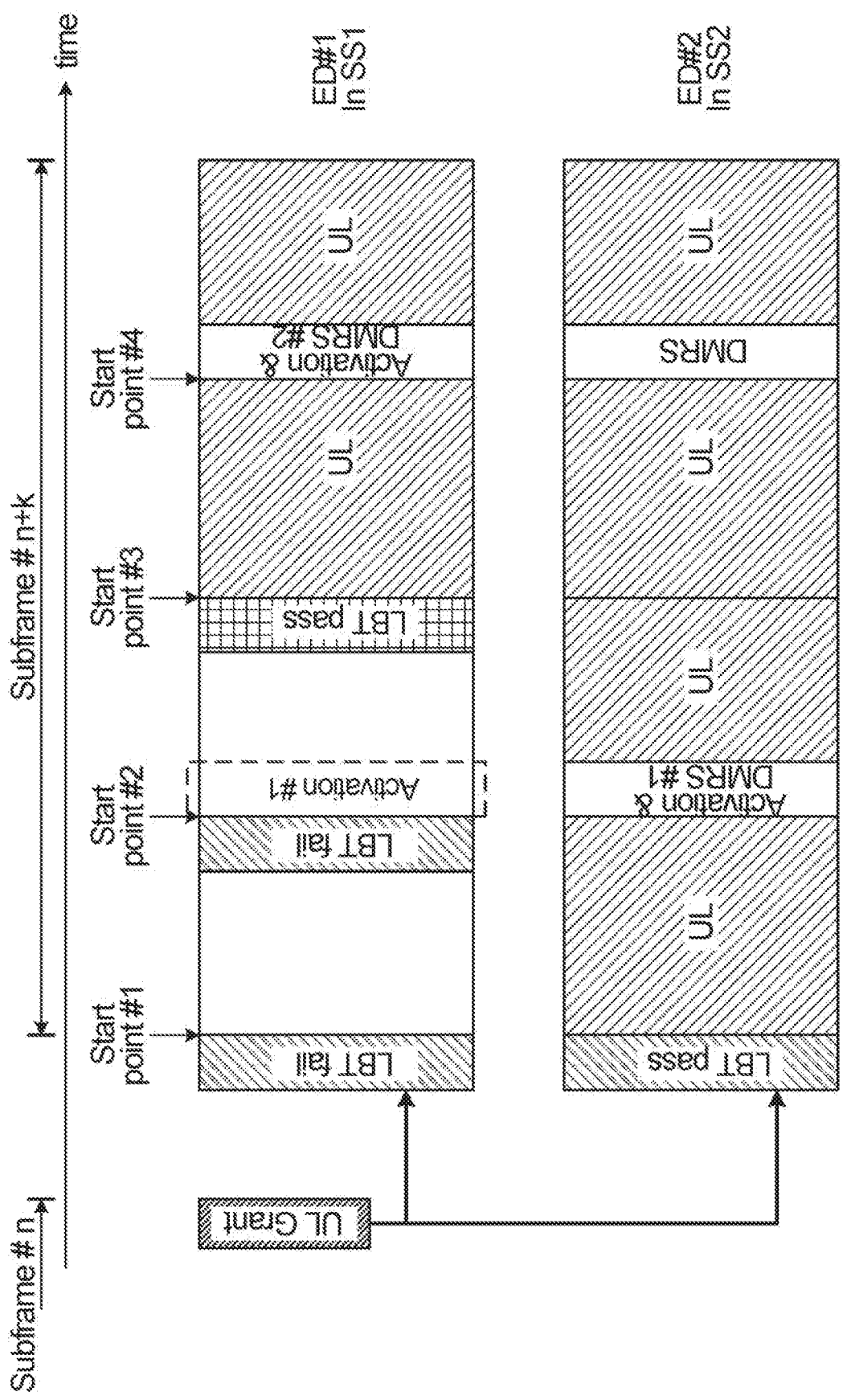

In UL MU MIMO, multiple EDs may be scheduled on the same time-frequency resource simultaneously. FIGS. 5A, 5B and 5C are timing diagrams showing examples of an unlicensed spectrum band access procedure by an ED for grant-based uplink transmission that supports UL MU MIMO in accordance with an embodiment of the present disclosure. In these examples, two EDs (ED #1 and ED #2) are allocated the same time-frequency resource, and their respective uplink transmissions are distinguished by spatial layer separation.

In FIG. 5A, UL MU MIMO is supported by reserving the first symbol(s) of each start point for DMRS and/or activation signal transmission for all EDs scheduled in the same time-frequency resource. For example, the uplink transmission transmitted by ED #2 after its successful LBT operation at the boundary of subframe #n+k includes ED #2's DMRS and/or activation signal at the location of start points #1-4, which the base station can potentially use to estimate the channel and decode uplink data in each mini-slot. This means that the base station can potentially start decoding ED #2's uplink payload data in each mini-slot as soon as it is received.

In FIG. 5B, UL MU MIMO is supported by reserving the pre-configured symbol interval(s) after the last start point in the subframe, e.g., the last OS interval(s) of the subframe, for DMRS transmission. In this example, each UE transmits an activation signal at the beginning of its uplink transmission and then transmits its DMRS in the last OS intervals at the end of the subframe #n+k. For example, UE #2 transmits its activation signal in start point #1 after its successful LBT operation at the boundary of subframe #n+k, but does not transmit its DMRS until the last OS intervals at the end of subframe #n+k. Similarly, UE #1 transmits its activation signal at start point #3 after its LBT operation succeeds, but does not transmit its DMRS until the last OS intervals at the end of subframe #n+k. This example saves signaling overhead relative to the example shown in FIG. 5A (because the first symbol(s) of each mini-slot are not reserved for DMRS and/or activation signal transmission), at the cost of potentially higher latency, because the base station has to wait until it receives the DMRS at the end of the subframe before it can decode the channel and the uplink data.

As shown in FIG. 5B, in some embodiments the activation signal can be a "lite" version that may be suitable for activation detection, but not for channel estimation. For example, an activation signal may be sparse in the frequency domain, which is shown by way of example in the activation signal transmitted by UE #1 at start point #3 in FIG. 5B.

In FIG. 5C, the positions of the activation signal and DMRS are pre-configured. For example, the possible positions are at the start point of #2 and #4. ED #2 starts uplink transmission from start point #1 and will transmit DMRS at both locations, with the DMRS sequence at least in first location indicating the uplink transmission starting at start point #1. ED #1 starts uplink transmission from start point #3 and will transmit DMRS at the second location with a DMRS sequence indicating the start point #3. In this example, all DMRS sequences are orthogonal or have low cross correlation, which facilitates reliable channel estimation across different spatial layers. In the embodiment, there is no additional activation signaling required. The use of multiple DMRSs can potentially provide better channel estimation in scenarios of higher mobility. In addition, the receiving latency is smaller than the case in FIG. 5B. A larger buffer size is required because the base station does not know exactly when the uplink transmission starts until the DMRS symbol is detected.

Figure 6:
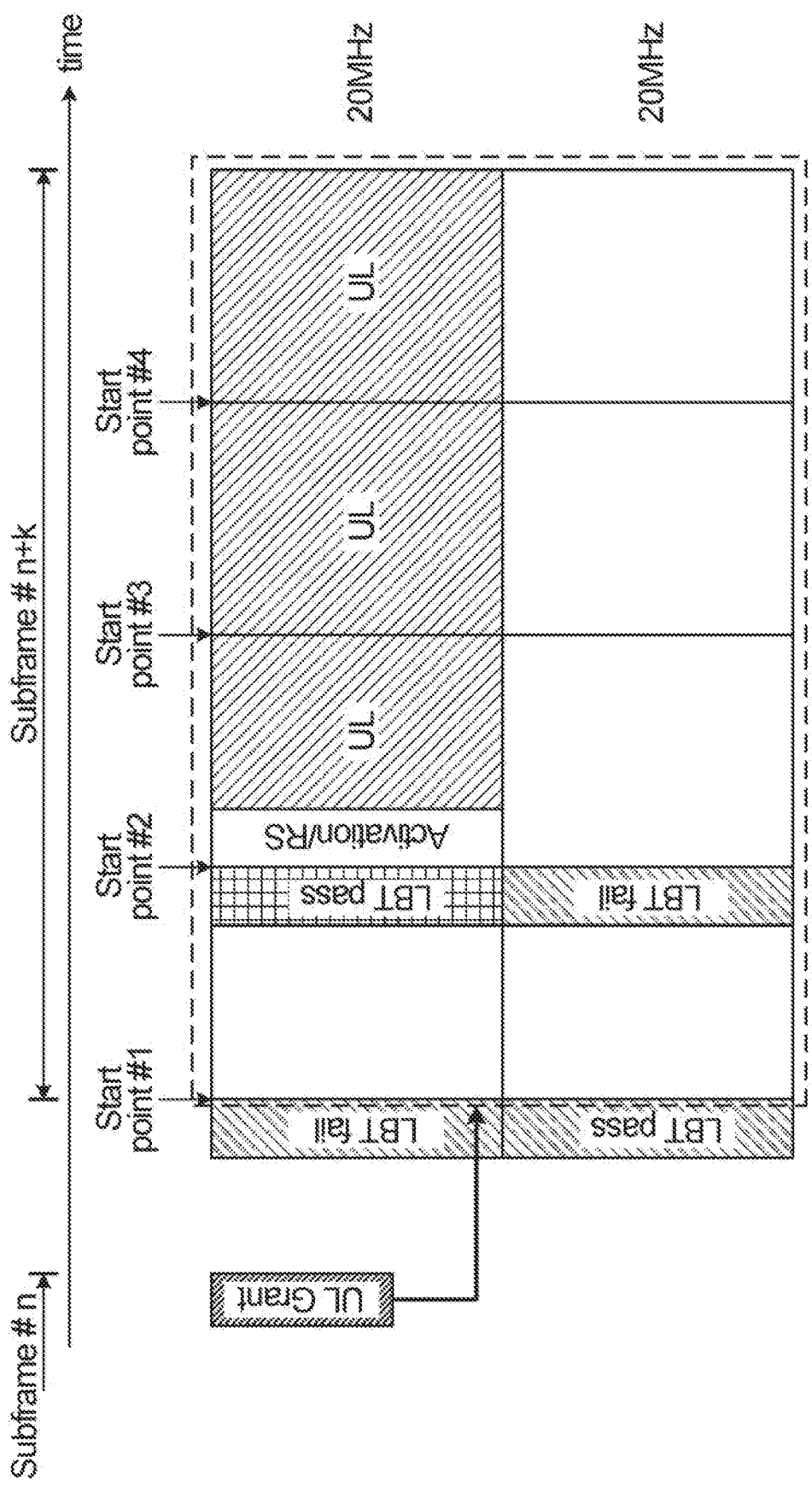
FIG. 6 is a timing diagram showing an example of an unlicensed spectrum band access procedure by an ED for grant-based uplink transmission that supports the scheduling of an ED on a time-frequency resource that spans one LBT bandwidth in the frequency domain in accordance with an embodiment of the present disclosure.

In some cases, the time-frequency resource scheduled to an ED may be across one LBT bandwidth in the frequency domain, e.g. multiple PRBs across 20 MHz channel boundaries. FIG. 6 is a timing diagram showing an example of an unlicensed spectrum band access procedure by an ED for grant-based uplink transmission that supports the scheduling of an ED on such a time-frequency resource.

In FIG. 6, an ED is allocated a time-frequency resource that includes a set of subcarriers of a first 20 MHz CC bandwidth and a set of subcarriers of a second 20 MHz CC bandwidth. The ED performs LBT operations for the first 20 MHz CC bandwidth that are based on energy measured on the allocated set of subcarriers of the first 20 MHz CC bandwidth and LBT operations for the second 20 MHz CC bandwidth that are based on energy measured on the allocated set of subcarriers of the second 20 MHz CC bandwidth. The LBT operations are performed at the potential start points in a slot/subframe. In FIG. 6, both of the initial LBT operations for the first and second 20 MHz CC bandwidths at the subframe boundary of subframe #n+k fail. The LBT operation for the second 20 MHz CC bandwidth at the start point #2 also fails. However, the LBT operation for the first 20 MHz CC bandwidth at the start point #2 succeeds, and the ED begins transmitting an uplink transmission on an allocated set of subcarriers of the first 20 MHz CC bandwidth at start point #2 and continues to do so until the end of the slot/subframe. In this example, the ED does not continue with further LBT operations for the second 20 MHz CC bandwidth at the boundaries of start point #3 or #4 once the LBT operation for the first 20 MHz CC bandwidth at the start point #2 succeeds. However, in other embodiments, the ED may continue to perform LBT operations for the second 20 MHz CC bandwidth at subsequent start points within the allocated time-frequency resource even after an LBT operation for the first 20 MHz CC bandwidth succeeds. Furthermore, if a subsequent LBT operation for the second 20 MHz CC bandwidth succeeds, the ED may begin transmitting an uplink transmission on the allocated subset of the second 20 MHz CC bandwidth within the portion of the allocated time-frequency resource that remains after the success of the LBT operation for the second 20 MHz CC bandwidth.

Figure 7A:
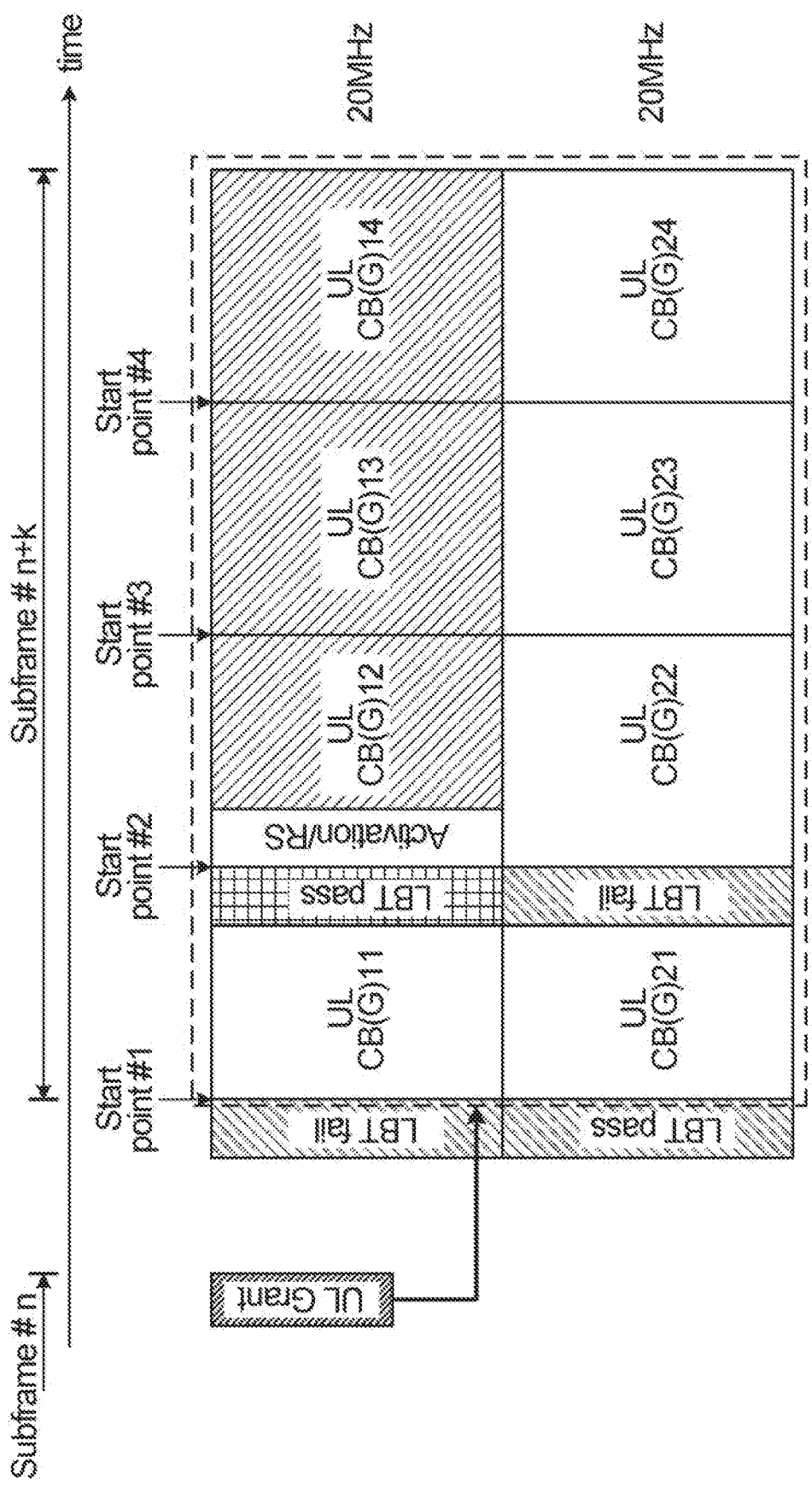
FIGS. 7A and 7B are timing diagrams showing two options for adapting the CBs that may be transmitted as part of the uplink transmission in the scenario depicted in FIG. 6.
Figure 7B:
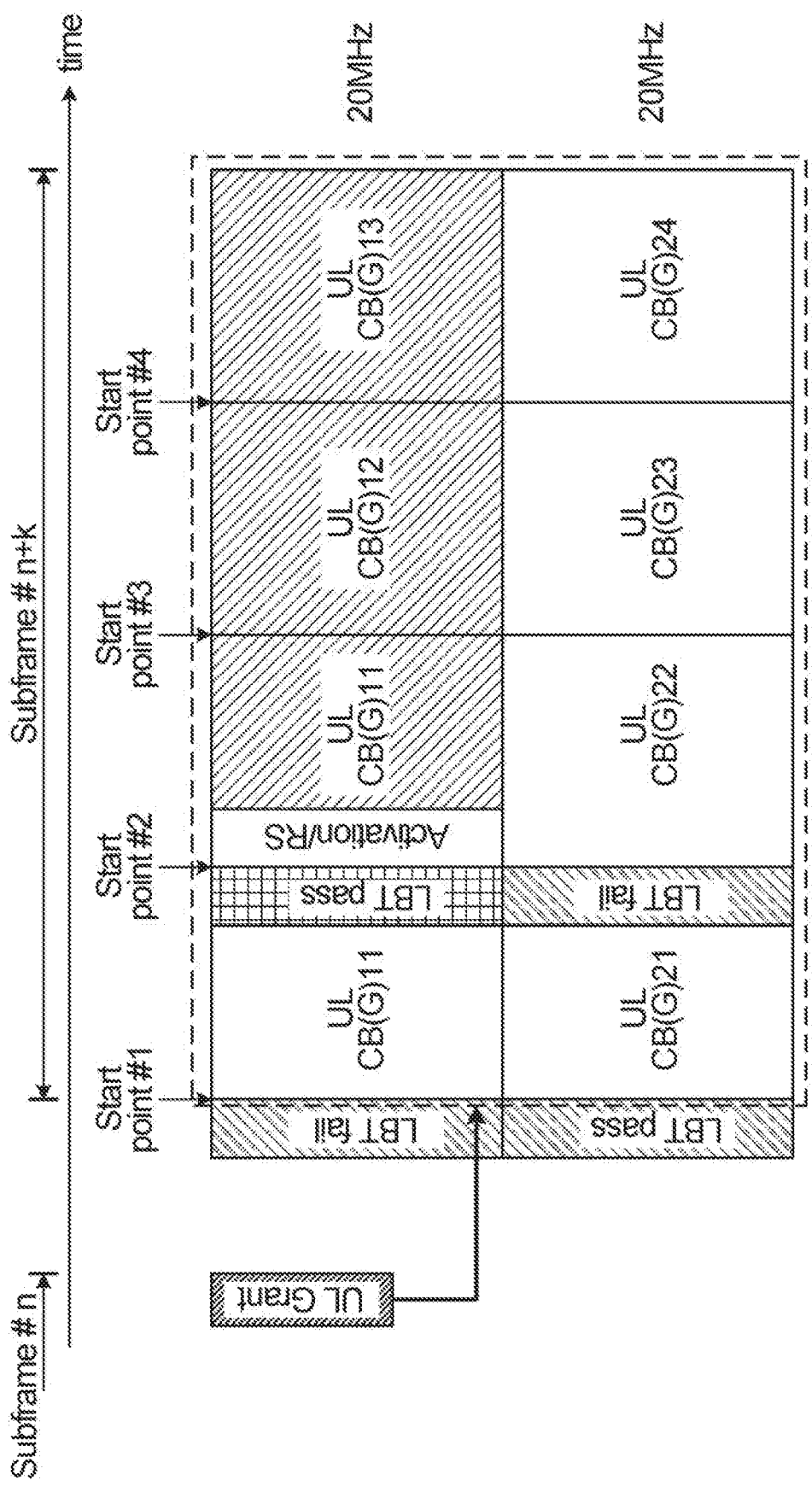

In some embodiments, a code block (CB) size may be adapted based on the time-frequency resource size, in terms of frequency bandwidth and/or time within the allocated time-frequency resource, that is available for uplink transmission. For example, referring again to FIG. 6, the CB size may be adapted to account for only half of the frequency bandwidth of the allocated time-frequency resource (i.e., only one of the two 20 MHz CC bandwidths) and only one interval between two consecutive start points (e.g. number of OFDM symbols between start point #n and start point #n+1). FIGS. 7A and 7B are timing diagrams showing two options for adapting the CBs that may be transmitted as part of the uplink transmission in the scenario depicted in FIG. 6.

In both FIGS. 7A and 7B, there is a predefined mapping between code blocks of data and start points within the allocated time-frequency resource. For example, code blocks CB(G) 11, CB(G) 12, CB(G) 13 and CB(G) 14 are mapped to start point #1, start point #2, start point #3 and start point #4, respectively, on the allocated set of subcarriers of the first 20 MHz CC bandwidth. Similarly, code blocks CB(G) 21, CB(G) 22, CB(G) 23 and CB(G) 24 are mapped to start point #1, start point #2, start point #3 and start point #4, respectively, on the allocated set of subcarriers of the second 20 MHz CC bandwidth.

In FIG. 7A, the uplink payload data that is transmitted as part of the uplink transmission that starts at start point #2 includes code blocks CB(G) 12, CB(G) 13 and CB(G) 14. These are the code blocks of data that are mapped to the start points within the remaining portion of the allocated time-frequency resource after the LBT operation succeeds at start point #2.

In contrast, in the second option shown in FIG. 7B, the uplink payload data this is transmitted as part of the uplink transmission includes CB(G) 11, CB(G) 12 and CB(G) 13. These are the code blocks of data starting with the code block mapped to the first start point of the allocated time-frequency resource and continuing sequentially in the time domain.

In both of these scenarios, the un-transmitted CB may be rescheduled or retransmitted automatically.

Figure 8:
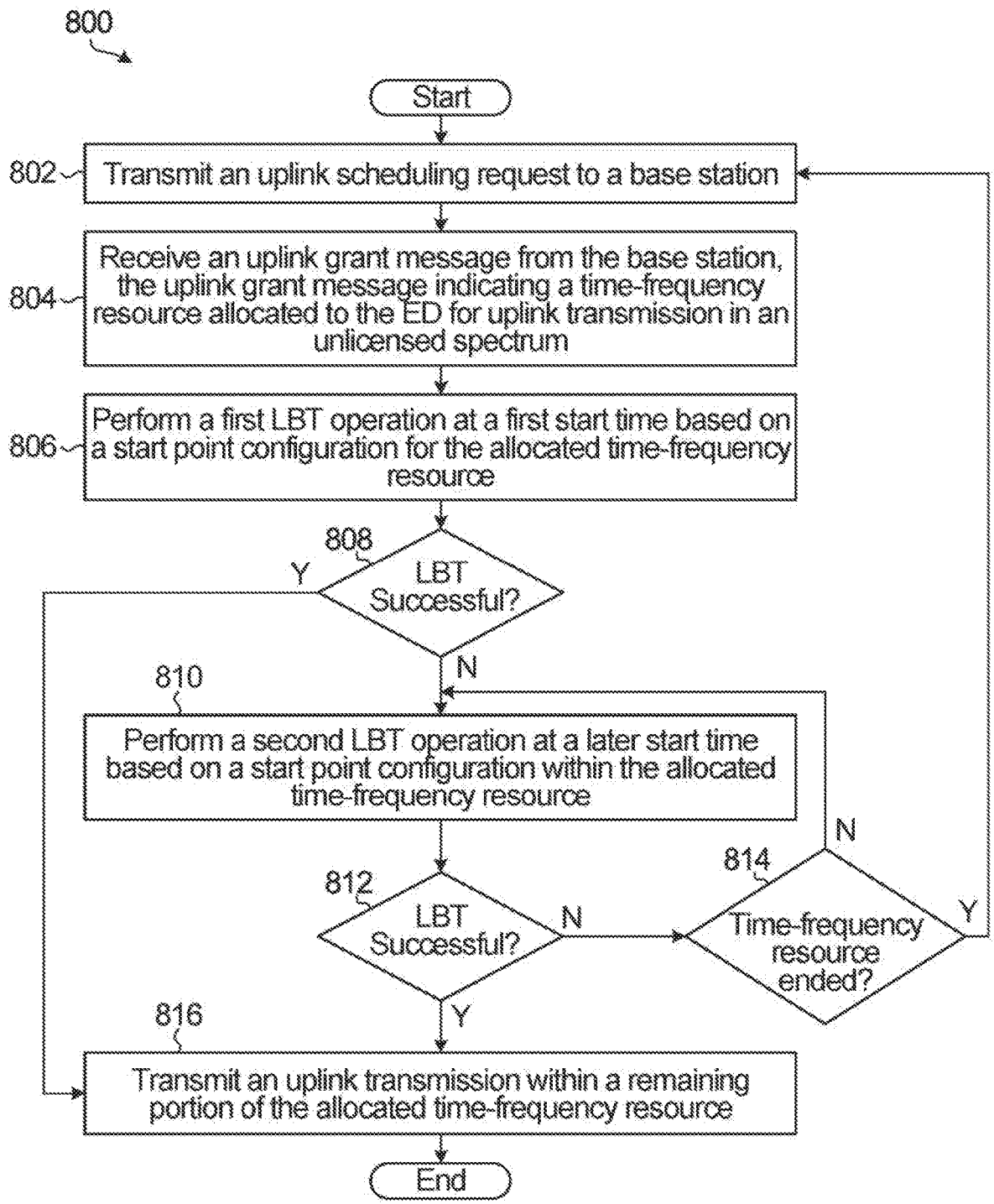
FIG. 8 is a flow diagram of example operations in an ED according to an embodiment of the present disclosure.

Various embodiments are described by way of example above. FIG. 8A is a flow diagram of example operations 800 in an ED according to an embodiment of the present disclosure.

At 802, the ED transmits an uplink scheduling request to a base station. At 804, the ED receives an uplink grant message from the base station indicating that the ED has been allocated a time-frequency resource for uplink transmission in an unlicensed spectrum. At 806, the ED performs a first LBT operation at a first start time based on a start point configuration for the allocated time-frequency resource as discussed previously. At 808, if the first LBT is successful, the ED proceeds to 816 (the Y path from 808), in which the ED transmits an uplink transmission within a remaining portion of the allocated time-frequency resource. The uplink transmission includes an activation signal and uplink payload data as discussed previously. If the first LBT at 808 is not successful, the ED proceeds to 810 (the N path from 808), in which the ED performs a second LBT operation at a later start time based on the start point configuration within the allocated time-frequency resource. At 812, if the second LBT operation is successful, the ED proceeds to 816 (the Y path from 812) and transmits an uplink transmission within the remaining portion of the allocated time-frequency resource. If the second LBT at 812 is not successful, the ED proceeds to 814 (the N path from 812), in which the ED checks if the time-frequency resource has ended. This may involve, for example, checking if the start point configuration indicates that there is still at least one possible start point for uplink transmission remaining in the allocated time-frequency resource. If there are no possible start points left for uplink transmission, the ED may return to 802 (the Y path from 814) to transmit another uplink scheduling request. If there is still at least one possible start point left for uplink transmission, the ED may return to 810 to perform another LBT operation at a later start time based on the start point configuration. In this way, if the first LBT operation at 808 fails, the ED may continue to loop through steps 810, 812 and 814 until either the time-frequency resource has ended or one of the LBT operations at 812 is successful and the ED is able to transmit an uplink transmission at 816.

Other variations of the example operations 800 could include performing the illustrated operations in any of various ways and/or performing additional or fewer operations.

For example, variations of the example operations 800 could include any or all of the following:

wherein the start point configuration indicates the configuration of a plurality of possible start points of uplink transmission within a subframe;

wherein each start point is either at an OFDM symbol boundary or midway between adjacent OFDM symbol boundaries, within the allocated time-frequency resource;

further comprising receiving, from the base station, information indicating the start point configuration;

wherein the activation signal is a demodulation reference signal (DMRS);

wherein transmitting an uplink transmission within the remaining portion of the allocated time-frequency resource comprises transmitting the uplink transmission with one or more blanking intervals within the remaining portion of the allocated time-frequency resource based on the start point configuration;

wherein performing a second LBT operation within the allocated time-frequency resource comprises performing an LBT operation at each of a plurality of start times based on the start point configuration until one of the LBT operations succeeds;

wherein the second LBT operation is performed during one or more orthogonal frequency division multiplexing (OFDM) symbol intervals immediately preceding a start point within the allocated time-frequency resource;

further comprising, in response to the second LBT operation succeeding, transmitting a reservation signal between the start point of uplink transmission and the closest OFDM symbol boundary after the start point;

wherein transmitting an uplink transmission within a remaining portion of the allocated time-frequency resource comprises transmitting the activation signal at a start point that is part of a pre-configured subset of possible start points within the allocated time-frequency resource;

wherein the pre-configured subset of possible start points includes every second possible start point for uplink transmission within the allocated time-frequency resource;

wherein the activation signal is selected by the ED from among a plurality of activation signals associated with the ED, the plurality of activation signals comprising: a first activation signal to indicate that uplink transmission started at a start point that preceded the start point at which the first activation signal is transmitted; and a second activation signal to indicate that uplink transmission started at or after the start point at which the first activation signal is transmitted;

wherein the ED configures a transport block size for the uplink payload data based on a size of the remaining portion of the allocated time-frequency resource;

wherein transmitting the uplink transmission comprises: using packet segmentation to generate the uplink payload data based on the adjusted transport block size;

wherein: uplink transmissions for different transport block sizes corresponding to different start points are generated in advance of the first possible start point of uplink transmission for the allocated time-frequency resource; and transmitting the uplink transmission comprises transmitting the uplink transmission for the transport block size corresponding to the start point of the uplink transmission;

wherein the ED uses rate matching or puncturing to fit a transport block into the remaining portion of the allocated time-frequency resource without changing the transport block size;

wherein: the ED is allocated a subset of subcarriers of a component carrier (CC) bandwidth; the second LBT operation is a wideband LBT operation that is based on energy measured on all of the subcarriers of the CC bandwidth during one or more OFDM symbol intervals immediately preceding a start point within the allocated time-frequency resource; and transmitting the uplink transmission comprises transmitting the uplink transmission on the allocated subset of subcarriers within the remaining portion of the allocated time-frequency resource with one or more blanking intervals based on the start point configuration;

wherein: the ED is allocated a subset of subcarriers of a component carrier (CC) bandwidth; the second LBT operation is a narrowband LBT operation that is based on energy measured on the allocated subset of subcarriers during one or more OFDM symbol intervals immediately preceding a start point within the allocated time-frequency resource; and transmitting the uplink transmission comprises transmitting the uplink transmission on the allocated subset of subcarriers within the remaining portion of the allocated time-frequency resource;

wherein the first LBT operation is a wideband LBT operation that is based on energy measured on all of the subcarriers of the CC bandwidth during one or more OFDM symbol intervals immediately preceding or immediately after a sub-frame boundary of the time-frequency resource;

wherein the allocated subset of subcarriers correspond to the subcarriers of a physical resource block (PRB) within the allocated time-frequency resource;

wherein transmitting an uplink transmission comprises transmitting the activation signal and/or a demodulation reference signal on the first one or more OFDM symbol intervals after start point within the remaining portion of the allocated time-frequency resource;

wherein transmitting an uplink transmission comprises: transmitting the activation signal on the first one or more OFDM symbol intervals of a first start point after the second LBT operation is successful; and transmitting a demodulation reference signal on the last one or more OFDM symbol intervals of a subframe at the end of the allocated time-frequency resource;

wherein the activation signal is sparse in the frequency domain;

wherein: the ED is allocated a set of subcarriers of a first component carrier (CC) bandwidth; the first and second LBT operations are based on energy measured on the allocated set of subcarriers of the first CC bandwidth; transmitting the uplink transmission comprises transmitting a first uplink transmission on the allocated set of subcarriers of the first CC bandwidth within a first remaining portion of the allocated time-frequency resource; the ED is allocated a set of subcarriers of a second CC bandwidth that is non-overlapping with the first CC bandwidth; and the operations further comprises performing LBT operations that are based on energy measured on the allocated set of subcarriers of the second CC bandwidth at the same time that the LBT operations that are based on energy measured on the allocated set of subcarriers of the first CC bandwidth are performed;

further comprising: continuing to perform LBT operations that are based on energy measured on the allocated set of subcarriers of the second CC bandwidth at subsequent start points within the allocated time-frequency resource after the second LBT operation based on energy measured on the allocated set of subcarriers of the first CC bandwidth succeeds; and in response to one of the LBT operations that are based on energy measured on the allocated set of subcarriers of the first CC bandwidth succeeding, transmitting a second uplink transmission on the allocated set of subcarriers of the second CC bandwidth within a second remaining portion of the allocated time-frequency resource, the second uplink transmission comprising: a second activation signal to indicate a start of the second uplink transmission; and second uplink payload data;

wherein: there is a predefined mapping between code blocks of data and start point within the allocated time-frequency resource; and the uplink payload data that is transmitted as part of the uplink transmission includes the code blocks of data that are mapped to start points within the remaining portion of the allocated time-frequency resource;

wherein: there is a predefined mapping between code blocks of data and start points within the allocated time-frequency resource; and the uplink payload data that is transmitted as part of the uplink transmission includes a sequence of code blocks of data starting with the code block mapped to the first start point of the allocated time-frequency resource.

Figure 9:
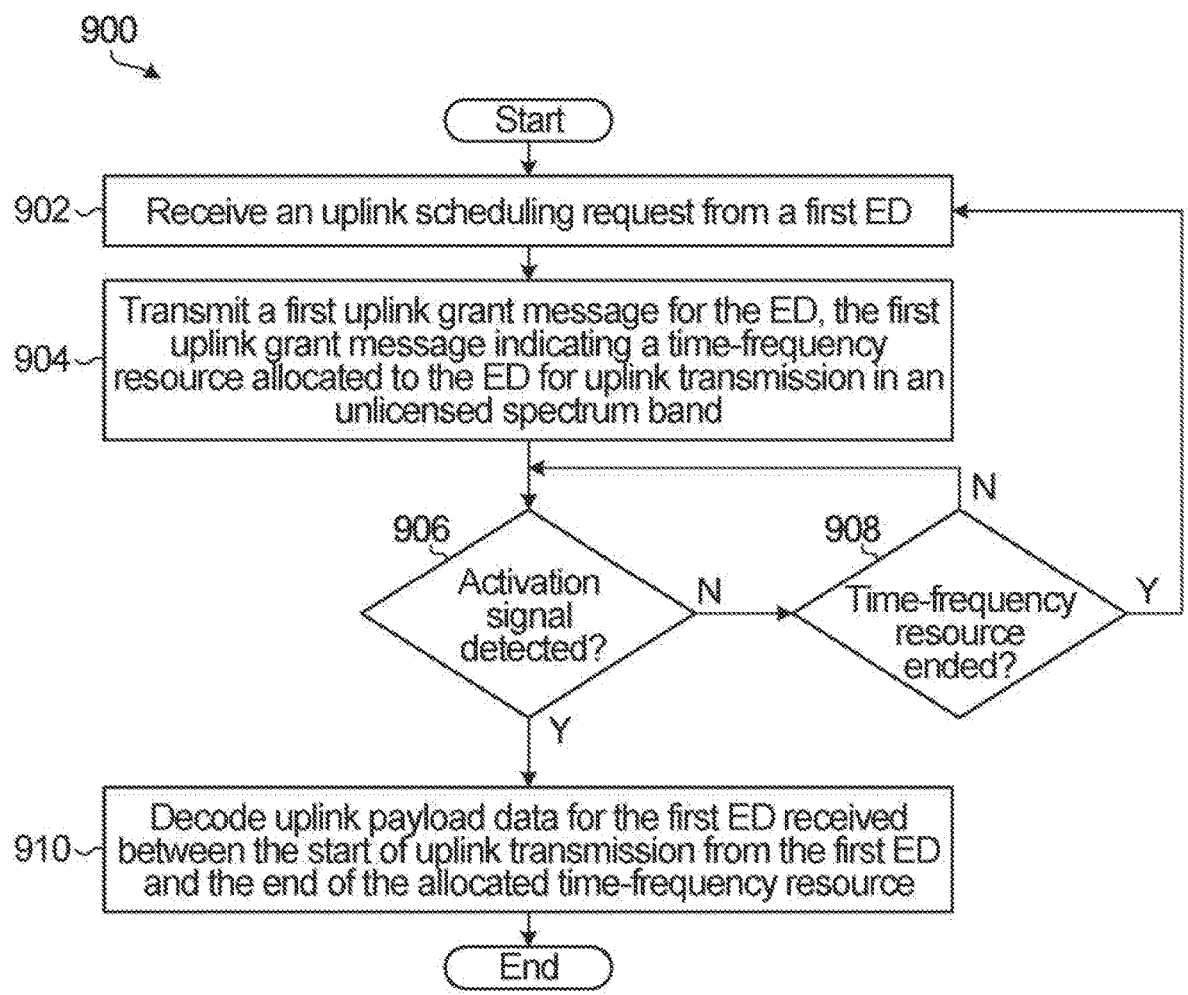
FIG. 9 is a flow diagram of examples operations in a base station in accordance with an embodiment of the present disclosure.

FIG. 9 is a flow diagram of example operations 900 in a base station according to an embodiment of the present disclosure.

At 902, the base station receives an uplink scheduling request from a first ED. At 904, the base station transmits a first uplink grant message for the first ED, the first uplink grant message indicating a time-frequency resource allocated to the first ED for uplink transmission in an unlicensed spectrum band. At 906, the base station monitors for detection of an activation signal associated with the first ED at start times based on a start point configuration within the allocated time-frequency resource. If an activation signal associated with the first ED is detected at 906, the base station proceeds to 910 (the Y path from 906), in which the base station decodes uplink payload data for the first ED that was received between the start of uplink transmission from the first ED and the end of the allocated time-frequency resource. If an activation signal associated with the first ED is not detected at 906, the base station proceeds to 908, in which the base station checks if the time-frequency resource has ended, e.g., if the start point configuration indicates that no further start points for uplink transmission remain in the allocated time-frequency resource. If the time-frequency resource has ended, the base station may return to the start and await a further uplink scheduling request from the first ED (the Y path from 908). If the time-frequency resource has not yet ended, such that at least one possible start point for uplink transmission remains within the allocated time-frequency resource, then the base station may return to 906 (the N path from 908) to continue to monitor for detection of an activation signal associated with the first ED. In this way, the base station may continue to monitor for the activation signal until either the activation signal associated with the first ED is detected or the allocated time-frequency resource ends.

Other variations of the example operations 90o could include performing the illustrated operations in any of various ways and/or performing additional or fewer operations.

For example, variations of the example operations 90o could include any or all of the following:

wherein the start point configuration indicates the configuration of a plurality of start point within a subframe;

further comprising: pre-configuring the start point configuration at the base station; and transmitting, from the base station, an information message indicating the start point configuration;

wherein the activation signal is a demodulation reference signal (DMRS) associated with the first ED and the base station uses the DMRS to decode the uplink payload data for the first ED;

wherein decoding uplink payload data for the first ED comprises decoding the uplink payload data taking into account one or more blanking intervals within the remaining portion of the allocated time-frequency resource based on the mini-slot configuration wherein monitoring for detection of the activation signal associated with the first ED comprises monitoring for detection of the activation signal associated with the first ED starting at or after each of a plurality of start point within the allocated time-frequency resource until either the activation signal associated with the first ED is detected or the allocated time-frequency resource ends;

wherein monitoring for detection of an activation signal associated with the first ED comprises monitoring for detection of the activation signal at a pre-configured subset of the possible start points for uplink transmission within the allocated time-frequency resource;

wherein the pre-configured subset of possible start points includes every second possible start point for uplink transmission within the allocated time-frequency resource;

wherein monitoring for detection of an activation signal associated with the first ED comprises monitoring for detection of a plurality of activation signals associated with the first ED, the plurality of activation signals comprising: a first activation signal to indicate that uplink transmission started at a start point that preceded the start point at which the first activation signal is transmitted; and a second activation signal to indicate that uplink transmission started at or after the start point at which the first activation signal is transmitted;

wherein decoding the uplink payload data for the first ED in response to detecting the activation signal indicating the start of uplink transmission from the first ED comprises: determining an expected transport block size for the uplink payload data based on a size of a remaining portion of the allocated time-frequency resource after the start of uplink transmission from the first ED; and decoding the uplink payload data based in part on the expected transport block size;

wherein the base station determines the expected transport block size based on a mapping between transport block sizes and possible start points for uplink transmission within the allocated time-frequency resource;

wherein decoding the uplink payload data takes into account rate matching or puncturing done by the first ED to fit a transport block into the remaining portion of the allocated time-frequency resource;

wherein: the first uplink grant message for the first ED indicates the first ED is allocated a first subset of subcarriers of a component carrier (CC) bandwidth within the time-frequency resource; monitoring for detection of an activation signal associated with the first ED comprises monitoring for the detection of the activation signal associated with the first ED on the first subset of subcarriers allocated to the first ED; and decoding uplink payload data for the first ED in response to detecting the activation signal associated with the first ED comprises decoding the uplink payload data for the first ED received by the base station on the first subset of subcarriers allocated to the first ED between the start of uplink transmission from the first ED and the end of the time-frequency resource;

further comprising: transmitting a second uplink grant message for a second ED, the second uplink grant message indicating the second ED is allocated a second subset of subcarriers of the CC bandwidth within the time-frequency resource for uplink transmission in the unlicensed spectrum band, the second subset of subcarriers being non-overlapping with the first subset of subcarriers; monitoring for detection of an activation signal associated with the second ED on the second subset of subcarriers at start times based on the start point configuration within the time-frequency resource until either the activation signal associated with the second ED is detected or the time-frequency resource ends, the activation signal associated with the second ED indicting a start of uplink transmission from the second ED; and in response to detecting the activation signal associated with the second ED, decoding uplink payload data for the second ED received by the base station on the second subset of subcarriers between the start of uplink transmission from the second ED and the end of the time-frequency resource;

wherein the allocated subsets of subcarriers correspond to the subcarriers of first and second physical resource blocks (PRBs), respectively, within the time-frequency resource;

wherein the base station decodes the uplink payload data for the first ED based in part on a demodulation reference signal transmitted by the first ED as part of the uplink transmission on the first one or more OFDM symbol intervals of each start point between the start of uplink transmission from the first ED and the end of the allocated time-frequency resource;

wherein the base station decodes the uplink payload data for the first ED based in part on a demodulation reference signal transmitted by the first ED as part of the uplink transmission on the last one or more OFDM symbol intervals of a subframe at the end of the allocated time-frequency resource;

wherein: the first uplink grant message for the first ED indicates the first ED is allocated first and second component carrier (CC) bandwidths within the time-frequency resource; monitoring for detection of an activation signal associated with the first ED comprises: monitoring for detection of a first activation signal associated with the first ED on a set of subcarriers of the first CC bandwidth, the first activation signal indicating a start of first uplink transmission from the first ED on the set of subcarriers of the first CC bandwidth; and monitoring for detection of a second activation signal associated with the first ED on a set of subcarriers of the second CC bandwidth, the second activation signal indicating a start of second uplink transmission from the first ED on the set of subcarriers of the second CC bandwidth; and decoding uplink payload data for the first ED in response to detecting the activation signal comprises at least one of: in response to detecting the first activation signal associated with the first ED on the set of subcarriers of the first CC bandwidth, decoding first uplink payload data for the first ED received by the base station on the set of subcarriers of the first CC bandwidth between the start of first uplink transmission from the first ED and the end of the allocated time-frequency resource; and in response to detecting the second activation signal associated with the first ED on the set of subcarriers of the second CC bandwidth, decoding second uplink payload data for the first ED received by the base station on the set of subcarriers of the second CC bandwidth between the start of second uplink transmission from the first ED and the end of the allocated time-frequency resource;

further comprising: transmitting a second uplink grant message for a second ED, the second uplink grant message indicating the second ED is allocated the set of subcarriers of the second CC bandwidth within the time-frequency resource for uplink transmission in the unlicensed spectrum band; monitoring for detection of an activation signal associated with the second ED on the set of subcarriers of the second CC bandwidth at start times based on the start point configuration within the time-frequency resource until either the activation signal associated with the second ED is detected or the time-frequency resource ends, the activation signal associated with the second ED indicating a start of uplink transmission from the second ED; and in response to detecting the activation signal associated with the second ED, decoding uplink payload data for the second ED received by the base station on the set of subcarriers of the second CC bandwidth between the start of uplink transmission from the second ED and the end of the time-frequency resource.

Figure 10A:
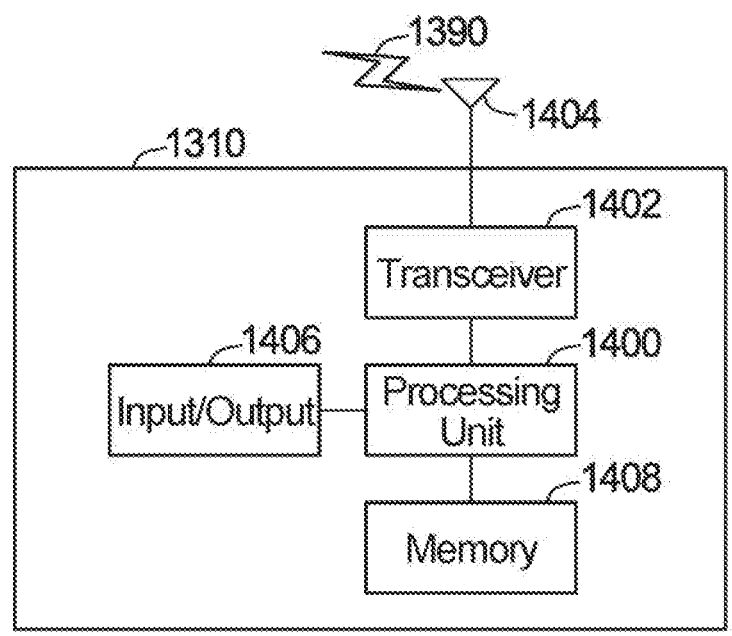
FIGS. 10A and 10B are block diagrams of an example ED and base station, respectively.
Figure 10B:
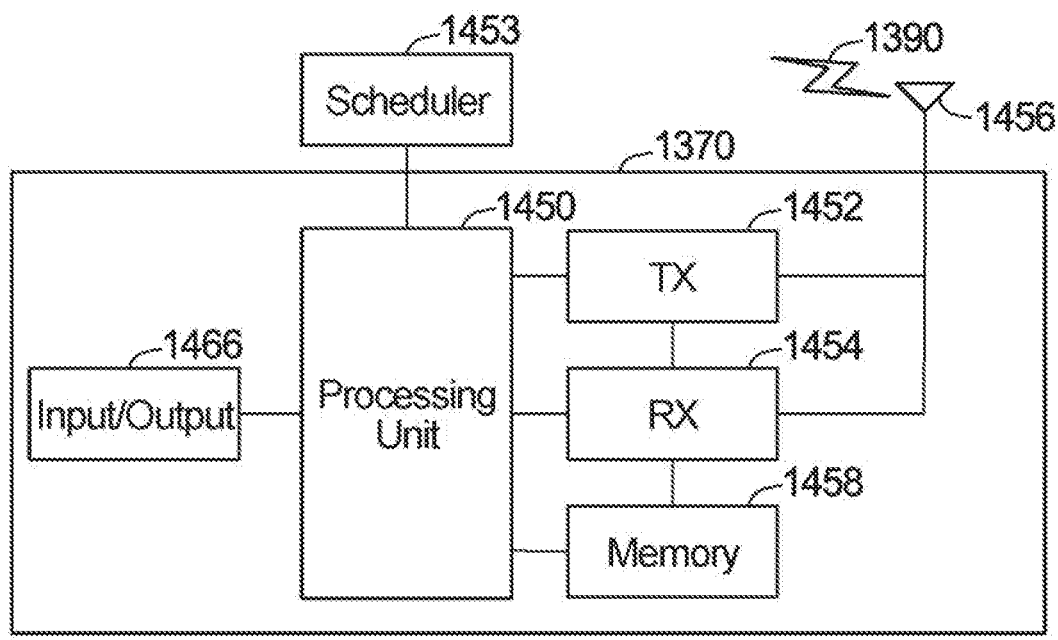

FIGS. 10A and 10B illustrate example devices that may implement the methods and teachings according to this disclosure. In particular, FIG. 10A illustrates an example ED 110, and FIG. 10B illustrates an example base station 170. These components could be used in the communication system 100 or in any other suitable system.

As shown in FIG. 10A, the ED no includes at least one processing unit 200. The processing unit 200 implements various processing operations of the ED 110. For example, the processing unit 200 could perform signal coding, data processing, power control, input/output processing, or any other functionality enabling the ED no to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED no also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED no. One or multiple antennas 204 could be used in the ED 110. Although shown as a single functional unit, a transceiver 202 could also be implemented using at least one transmitter and at least one separate receiver.

The ED no further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED no includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED no. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs no and the base stations 170 are known to those of skill in the art. As such, these details are omitted here for clarity.

EXAMPLE EMBODIMENTS

The following provides a non-limiting list of Example Embodiments of the present disclosure:

Example Embodiment 1

A method for an Electronic Device (ED) in a wireless network, the method comprising:

receiving an uplink grant message from a base station, the uplink grant message indicating a time-frequency resource allocated to the ED for uplink transmission in an unlicensed spectrum band;

performing a first listen-before-talk (LBT) operation for the allocated time-frequency resource;

performing a second LBT operation within the allocated time-frequency resource.

Example Embodiment 2

The method of Example Embodiment 1, further comprising:

in response to the second LBT operation succeeding, transmitting an uplink transmission within a remaining portion of the allocated time-frequency resource, the uplink transmission comprising:

an activation signal to indicate a start of the uplink transmission; and uplink payload data.

Example Embodiment 3

The method of Example Embodiment 2, wherein the second LBT operation is performed at a start time based on a start point configuration within the allocated time frequency resource.

Example Embodiment 4

The method of Example Embodiment 3, wherein the start point configuration indicates the configuration of a plurality of possible start points of uplink transmission within a subframe.

Example Embodiment 5

The method of Example Embodiment 4, wherein each start point is either at an OFDM symbol boundary or midway between adjacent OFDM symbol boundaries, within the allocated time-frequency resource.

Example Embodiment 6

The method of Example Embodiment 3, further comprising receiving, from the base station, information indicating the start point configuration.

Example Embodiment 7

The method of Example Embodiment 2, wherein the activation signal is a demodulation reference signal (DMRS).

Example Embodiment 8

The method of Example Embodiment 3, wherein transmitting an uplink transmission within the remaining portion of the allocated time-frequency resource comprises transmitting the uplink transmission with one or more blanking intervals within the remaining portion of the allocated time-frequency resource based on the start point configuration.

Example Embodiment 9

The method of Example Embodiments 3, wherein performing a second LBT operation within the allocated time-frequency resource comprises performing an LBT operation at each of a plurality of start times based on the start point configuration until one of the LBT operations succeeds.

Example Embodiment 10

The method of Example Embodiment 1, wherein the second LBT operation is performed during one or more orthogonal frequency division multiplexing (OFDM) symbol intervals immediately preceding a start point within the allocated time-frequency resource.

Example Embodiment 11

The method of Example Embodiment 10, further comprising, in response to the second LBT operation succeeding, transmitting a reservation signal between the start point of uplink transmission and the closest OFDM symbol boundary after the start point.

Example Embodiment 12

The method of Example Embodiment 11, wherein the reservation signal includes a cyclic prefix extension of the following OFDM symbol.

Example Embodiment 13

The method of Example Embodiment 2, wherein transmitting an uplink transmission within a remaining portion of the allocated time-frequency resource comprises transmitting the activation signal at a start point that is part of a pre-configured subset of possible start points within the allocated time-frequency resource.

Example Embodiment 14

The method of Example Embodiment 13, wherein the pre-configured subset of possible start points includes every second possible start point for uplink transmission within the allocated time-frequency resource.

Example Embodiment 15

The method of Example Embodiment 13, wherein the activation signal is selected by the ED from among a plurality of activation signals associated with the ED, the plurality of activation signals comprising:
a first activation signal to indicate that uplink transmission started at a start point that preceded the start point at which the first activation signal is transmitted; and
a second activation signal to indicate that uplink transmission started at or after the start point at which the first activation signal is transmitted.

Example Embodiment 16

The method of Example Embodiment 2, wherein the ED configures a transport block size for the uplink payload data based on a size of the remaining portion of the allocated time-frequency resource.

Example Embodiment 17

The method of Example Embodiment 16, wherein transmitting the uplink transmission comprises:
using packet segmentation to generate the uplink payload data based on the adjusted transport block size.

Example Embodiment 18

The method of Example Embodiment 16, wherein:
uplink transmissions for different transport block sizes corresponding to different start points are generated in advance of the first possible start point of uplink transmission for the allocated time-frequency resource; and
transmitting the uplink transmission comprises transmitting the uplink transmission for the transport block size corresponding to the start point of the uplink transmission.

Example Embodiment 19

The method of Example Embodiment 2, wherein the ED uses rate matching or puncturing to fit a transport block into the remaining portion of the allocated time-frequency resource without changing the transport block size.

Example Embodiment 20

The method of Example Embodiment 3, wherein:
the ED is allocated a subset of subcarriers of a component carrier (CC) bandwidth;
the second LBT operation is a wideband LBT operation that is based on energy measured on all of the subcarriers of the CC bandwidth during one or more OFDM symbol intervals immediately preceding a start point within the allocated time-frequency resource; and
transmitting the uplink transmission comprises transmitting the uplink transmission on the allocated subset of subcarriers within the remaining portion of the allocated time-frequency resource with one or more blanking intervals based on the start point configuration.

Example Embodiment 21

The method of Example Embodiment 2, wherein:
the ED is allocated a subset of subcarriers of a component carrier (CC) bandwidth;
the second LBT operation is a narrowband LBT operation that is based on energy measured on the allocated subset of subcarriers during one or more OFDM symbol intervals immediately preceding a start point within the allocated time-frequency resource; and
transmitting the uplink transmission comprises transmitting the uplink transmission on the allocated subset of subcarriers within the remaining portion of the allocated time-frequency resource.

Example Embodiment 22

The method of Example Embodiment 21, wherein the first LBT operation is a wideband LBT operation that is based on energy measured on all of the subcarriers of the CC bandwidth during one or more OFDM symbol intervals immediately preceding or immediately after a sub-frame boundary of the time-frequency resource.

Example Embodiment 23

The method of Example Embodiment 21, wherein the allocated subset of subcarriers correspond to the subcarriers of a physical resource block (PRB) within the allocated time-frequency resource.

Example Embodiment 24

The method of Example Embodiment 2, wherein:

the ED is allocated an interlace of a plurality of subsets of subcarriers of the CC bandwidth, the subsets of subcarriers of the interlace being distributed within the CC bandwidth;

the second LBT operation is one of a plurality of second LBT operations that are respectively based on energy measured on a respective one of the subsets of subcarriers of the CC bandwidth during one or more OFDM symbol intervals immediately preceding the start point within the allocated time-frequency resource; and transmitting the uplink transmission comprises transmitting, within the remaining portion of the allocated time-frequency resource, an uplink transmission on one or more of the allocated subsets of subcarriers for which the respective narrowband LBT procedure was successful.

Example Embodiment 25

The method of Example Embodiment 2, wherein transmitting an uplink transmission comprises transmitting the activation signal and/or a demodulation reference signal on the first one or more OFDM symbol intervals after a start point within the remaining portion of the allocated time-frequency resource.

Example Embodiment 26

The method of Example Embodiment 2, wherein transmitting an uplink transmission comprises:

transmitting the activation signal on the first one or more OFDM symbol intervals of a first start point after the second LBT operation is successful; and transmitting a demodulation reference signal on the last one or more OFDM symbol intervals of a subframe at the end of the allocated time-frequency resource.

Example Embodiment 27

The method of Example Embodiment 26, wherein the activation signal is sparse in the frequency domain.

Example Embodiment 28

The method of Example Embodiment 2 wherein:

the ED is allocated a set of subcarriers of a first component carrier (CC) bandwidth;

the first and second LBT operations are based on energy measured on the allocated set of subcarriers of the first CC bandwidth;

transmitting the uplink transmission comprises transmitting a first uplink transmission on the allocated set of subcarriers of the first CC bandwidth within a first remaining portion of the allocated time-frequency resource;

the ED is allocated a set of subcarriers of a second CC bandwidth that is non-overlapping with the first CC bandwidth; and the method further comprises performing LBT operations that are based on energy measured on the allocated set of subcarriers of the second CC bandwidth at the same time that the LBT operations that are based on energy measured on the allocated set of subcarriers of the first CC bandwidth are performed.

Example Embodiment 29

The method of Example Embodiment 28, further comprising:

continuing to perform LBT operations that are based on energy measured on the allocated set of subcarriers of the second CC bandwidth at subsequent start points within the allocated time-frequency resource after the second LBT operation based on energy measured on the allocated set of subcarriers of the first CC bandwidth succeeds; and in response to one of the LBT operations that are based on energy measured on the allocated set of subcarriers of the first CC bandwidth succeeding, transmitting a second uplink transmission on the allocated set of subcarriers of the second CC bandwidth within a second remaining portion of the allocated time-frequency resource, the second uplink transmission comprising:

a second activation signal to indicate a start of the second uplink transmission; and second uplink payload data.

Example Embodiment 30

The method of Example Embodiment 2, wherein:

there is a predefined mapping between code blocks of data and start point within the allocated time-frequency resource; and the uplink payload data that is transmitted as part of the uplink transmission includes the code blocks of data that are mapped to start points within the remaining portion of the allocated time-frequency resource.

Example Embodiment 31

The method of Example Embodiment 2, wherein:

there is a predefined mapping between code blocks of data and start points within the allocated time-frequency resource; and the uplink payload data that is transmitted as part of the uplink transmission includes a sequence of code blocks of data starting with the code block mapped to a first start point of the allocated time-frequency resource.

Example Embodiment 32

A method for a base station in a wireless network, the method comprising:

transmitting a first uplink grant message for a first electronic device (ED), the first uplink grant message indicating a time-frequency resource allocated to the first ED for uplink transmission in an unlicensed spectrum band;

monitoring for detection of an activation signal associated with the first ED at start times based on a start point configuration within the allocated time-frequency resource until either the activation signal associated with the first ED is detected or the allocated time-frequency resource ends, the activation signal associated with the first ED indicating a start of uplink transmission from the first ED; and in response to detecting the activation signal associated with the first ED, decoding uplink payload data for the first ED received by the base station between the start of uplink transmission from the first ED and the end of the allocated time-frequency resource.

Example Embodiment 33

The method of Example Embodiment 32, wherein the start point configuration indicates the configuration of a plurality of start point within a subframe.

Example Embodiment 34

The method of Example Embodiment 32, further comprising:
pre-configuring the start point configuration at the base station; and
transmitting, from the base station, an information message indicating the start point configuration.

Example Embodiment 35

The method of Example Embodiment 32, wherein the activation signal is a demodulation reference signal (DMRS) associated with the first ED and the base station uses the DMRS to decode the uplink payload data for the first ED.

Example Embodiment 36

The method of Example Embodiment 32, wherein decoding uplink payload data for the first ED comprises decoding the uplink payload data taking into account one or more blanking intervals within the remaining portion of the allocated time-frequency resource based on the mini-slot configuration.

Example Embodiment 37

The method of Example Embodiment 32, wherein monitoring for detection of the activation signal associated with the first ED comprises monitoring for detection of the activation signal associated with the first ED starting at or after each of a plurality of start points within the allocated time-frequency resource until either the activation signal associated with the first ED is detected or the allocated time-frequency resource ends.

Example Embodiment 38

The method of Example Embodiment 32, wherein monitoring for detection of an activation signal associated with the first ED comprises monitoring for detection of the activation signal at a pre-configured subset of the possible start points for uplink transmission within the allocated time-frequency resource.

Example Embodiment 39

The method of Example Embodiment 38, wherein the pre-configured subset of possible start points includes every second possible start point for uplink transmission within the allocated time-frequency resource.

Example Embodiment 40

The method of Example Embodiment 38, wherein monitoring for detection of an activation signal associated with the first ED comprises monitoring for detection of a plurality of activation signals associated with the first ED, the plurality of activation signals comprising:

a first activation signal to indicate that uplink transmission started at a start point that preceded the start point at which the first activation signal is transmitted; and
a second activation signal to indicate that uplink transmission started at or after the start point at which the first activation signal is transmitted.

Example Embodiment 41

The method of Example Embodiment 32, wherein decoding the uplink payload data for the first ED in response to detecting the activation signal indicating the start of uplink transmission from the first ED comprises:
determining an expected transport block size for the uplink payload data based on a size of a remaining portion of the allocated time-frequency resource after the start of uplink transmission from the first ED; and
decoding the uplink payload data based in part on the expected transport block size.

Example Embodiment 42

The method of Example Embodiment 41, wherein the base station determines the expected transport block size based on a mapping between transport block sizes and possible start points for uplink transmission within the allocated time-frequency resource.

Example Embodiment 43

The method of Example Embodiment 32, wherein decoding the uplink payload data takes into account rate matching or puncturing done by the first ED to fit a transport block into the remaining portion of the allocated time-frequency resource.

Example Embodiment 44

The method of Example Embodiment 32, wherein:
the first uplink grant message for the first ED indicates the first ED is allocated a first subset of subcarriers of a component carrier (CC) bandwidth within the time-frequency resource;
monitoring for detection of an activation signal associated with the first ED comprises monitoring for the detection of the activation signal associated with the first ED on the first subset of subcarriers allocated to the first ED; and
decoding uplink payload data for the first ED in response to detecting the activation signal associated with the first ED comprises decoding the uplink payload data for the first ED received by the base station on the first subset of subcarriers allocated to the first ED between the start of uplink transmission from the first ED and the end of the time-frequency resource.

Example Embodiment 45

The method of Example Embodiment 44, further comprising:
transmitting a second uplink grant message for a second ED, the second uplink grant message indicating the second ED is allocated a second subset of subcarriers of the CC bandwidth within the time-frequency resource for uplink transmission in the unlicensed spectrum band, the second subset of subcarriers being non-overlapping with the first subset of subcarriers;

monitoring for detection of an activation signal associated with the second ED on the second subset of subcarriers at start times based on the start point configuration within the time-frequency resource until either the activation signal associated with the second ED is detected or the time-frequency resource ends, the activation signal associated with the second ED indicting a start of uplink transmission from the second ED; and in response to detecting the activation signal associated with the second ED, decoding uplink payload data for the second ED received by the base station on the second subset of subcarriers between the start of uplink transmission from the second ED and the end of the time-frequency resource.

Example Embodiment 46

The method of Example Embodiment 45, wherein the allocated subsets of subcarriers correspond to the subcarriers of first and second physical resource blocks (PRBs), respectively, within the time-frequency resource.

Example Embodiment 47

The method of Example Embodiment 32, wherein:
the first uplink grant message for the first ED indicates the first ED is allocated a first interlace of a plurality of subsets of subcarriers of a component carrier (CC) bandwidth within the time-frequency resource, the subsets of subcarriers of the first interlace being non-overlapping and distributed within the CC bandwidth;
monitoring for detection of an activation signal associated with the first ED comprises monitoring for the detection of the activation signal associated with the first ED on each of the subsets of subcarriers of the first interlace; and
decoding uplink payload data for the first ED in response to detecting the activation signal associated with the first ED comprises decoding uplink payload data for the first ED received by the base station on one or more of the subsets of subcarriers in the first interlace between the start of uplink transmission from the first ED and the end of the time-frequency resource.

Example Embodiment 48

The method of Example Embodiment 47, further comprising:
transmitting a second uplink grant message for a second ED, the second uplink grant message indicating the second ED is allocated a second interlace of a plurality of subsets of subcarriers of the CC bandwidth within the time-frequency resource for uplink transmission in the unlicensed spectrum band, the subsets of subcarriers of the second interlace being distributed within the CC bandwidth such that the second interlace is non-overlapping with the first interlace within the CC bandwidth;
monitoring for detection of an activation signal associated with the second ED on each of the subsets of subcarriers of the second interlace at start times based on the start point configuration within the time-frequency resource until either the activation signal associated with the second ED is detected or the time-frequency resource ends, the activation signal associated with the second ED indicting a start of uplink transmission from the second ED on the respective subset of subcarriers on which the activation signal is transmitted; and
in response to detecting the activation signal associated with the second ED, decoding uplink payload data for the second ED received by the base station on one or more of the subsets of subcarriers in the second interlace between the start of uplink transmission from the second ED and the end of the time-frequency resource.

Example Embodiment 49

The method of Example Embodiment 32, wherein the base station decodes the uplink payload data for the first ED based in part on a demodulation reference signal transmitted by the first ED as part of the uplink transmission on the first one or more OFDM symbol intervals of each start point between the start of uplink transmission from the first ED and the end of the allocated time-frequency resource.

Example Embodiment 50

The method of Example Embodiment 32, wherein the base station decodes the uplink payload data for the first ED based in part on a demodulation reference signal transmitted by the first ED as part of the uplink transmission on the last one or more OFDM symbol intervals of a subframe at the end of the allocated time-frequency resource.

Example Embodiment 51

The method of Example Embodiment 32, wherein:
the first uplink grant message for the first ED indicates the first ED is allocated first and second component carrier (CC) bandwidths within the time-frequency resource;
monitoring for detection of an activation signal associated with the first ED comprises:
monitoring for detection of a first activation signal associated with the first ED on a set of subcarriers of the first CC bandwidth, the first activation signal indicating a start of first uplink transmission from the first ED on the set of subcarriers of the first CC bandwidth; and
monitoring for detection of a second activation signal associated with the first ED on a set of subcarriers of the second CC bandwidth, the second activation signal indicating a start of second uplink transmission from the first ED on the set of subcarriers of the second CC bandwidth; and
decoding uplink payload data for the first ED in response to detecting the activation signal comprises at least one of:
in response to detecting the first activation signal associated with the first ED on the set of subcarriers of the first CC bandwidth, decoding first uplink payload data for the first ED received by the base station on the set of subcarriers of the first CC bandwidth between the start of first uplink transmission from the first ED and the end of the allocated time-frequency resource; and
in response to detecting the second activation signal associated with the first ED on the set of subcarriers of the second CC bandwidth, decoding second uplink payload data for the first ED received by the base station on the set of subcarriers of the second CC bandwidth between the start of second uplink transmission from the first ED and the end of the allocated time-frequency resource.

Example Embodiment 52

The method of Example Embodiment 51, further comprising:
transmitting a second uplink grant message for a second ED, the second uplink grant message indicating the second ED is allocated the set of subcarriers of the second CC bandwidth within the time-frequency resource for uplink transmission in the unlicensed spectrum band;

monitoring for detection of an activation signal associated with the second ED on the set of subcarriers of the second CC bandwidth at start times based on the start point configuration within the time-frequency resource until either the activation signal associated with the second ED is detected or the time-frequency resource ends, the activation signal associated with the second ED indicating a start of uplink transmission from the second ED; and in response to detecting the activation signal associated with the second ED, decoding uplink payload data for the second ED received by the base station on the set of subcarriers of the second CC bandwidth between the start of uplink transmission from the second ED and the end of the time-frequency resource.

Example Embodiment 53

An Electronic Device (ED) comprising:
one or more processors; and
a non-transitory computer readable storage medium storing programming for execution by the one or more processors, the programming including instructions to:
receive an uplink grant message from a base station, the uplink grant message indicating a time-frequency resource allocated to the ED for uplink transmission in an unlicensed spectrum band;
perform a first listen-before-talk (LBT) operation for the allocated time-frequency resource; and
perform a second LBT operation within the allocated time-frequency resource.

Example Embodiment 54

The ED of Example Embodiment 53, wherein the programming further comprises instructions to:
perform the second LBT operation at a start time based on a start point configuration within the allocated time-frequency resource; and
in response to the second LBT operation succeeding, transmit an uplink transmission within a remaining portion of the allocated time-frequency resource, the uplink transmission comprising: an activation signal to indicate a start of the uplink transmission; and uplink payload data.

Example Embodiment 55

The ED of Example Embodiment 54, wherein the start point configuration indicates the configuration of a plurality of possible start points of uplink transmission within a subframe.

Example Embodiment 56

The ED of Example Embodiment 55, wherein each start point is either at an OFDM symbol boundary or midway between adjacent OFDM symbol boundaries, within the allocated time-frequency resource.

Example Embodiment 57

The ED of any one of Example Embodiments 54 to 56, wherein the programming further comprises instructions to receive, from the base station, information indicating the start point configuration.

Example Embodiment 58

The ED of any one of Example Embodiments 54 to 57, wherein the activation signal is a demodulation reference signal (DMRS).

Example Embodiment 59

The ED of any one of Example Embodiments 54 to 58, wherein the instructions to transmit an uplink transmission within the remaining portion of the allocated time-frequency resource comprises instructions to transmit the uplink transmission with one or more blanking intervals within the remaining portion of the allocated time-frequency resource based on the start point configuration.

Example Embodiment 60

The ED of any one of Example Embodiments 54 to 59, wherein the instructions to perform a second LBT operation within the allocated time-frequency resource comprises instructions to perform an LBT operation at each of a plurality of start times based on the start point configuration until one of the LBT operations succeeds.

Example Embodiment 61

The ED of any one of Example Embodiments 54 to 58, wherein the second LBT operation is performed during one or more orthogonal frequency division multiplexing (OFDM) symbol intervals immediately preceding a start point within the allocated time-frequency resource.

Example Embodiment 62

The ED of any one of Example Embodiments 54 to 61, wherein the programming further comprises instructions to transmit a reservation signal between the start point of uplink transmission and the closest OFDM symbol boundary after the start point, in response to the second LBT operation succeeding.

Example Embodiment 63

The ED of Example Embodiment 62, wherein the reservation signal includes a cyclic prefix extension of the following OFDM symbol.

Example Embodiment 64

The ED of any one of Example Embodiments 54 to 63, wherein the instructions to transmit an uplink transmission within a remaining portion of the allocated time-frequency resource comprises instructions to transmit the activation signal at a start point that is part of a pre-configured subset of possible start points within the allocated time-frequency resource.

Example Embodiment 65

The ED of Example Embodiment 64, wherein the pre-configured subset of possible start points includes every second possible start point for uplink transmission within the allocated time-frequency resource.

Example Embodiment 66

The ED of Example Embodiment 64 or 65, wherein the activation signal is selected by the ED from among a plurality of activation signals associated with the ED, the plurality of activation signals comprising:

a first activation signal to indicate that uplink transmission started at a start point that preceded the start point at which the first activation signal is transmitted; and a second activation signal to indicate that uplink transmission started at or after the start point at which the first activation signal is transmitted.

Example Embodiment 67

The ED of any one of Example Embodiments 54 to 66, wherein the programming further comprises instructions to configure a transport block size for the uplink payload data based on a size of the remaining portion of the allocated time-frequency resource.

Example Embodiment 68

The ED of Example Embodiment 67, wherein the instructions to transmit the uplink transmission comprises instructions to use packet segmentation to generate the uplink payload data based on the adjusted transport block size.

Example Embodiment 69

The ED of Example Embodiment 57 or 58, wherein:

the programming further comprises instructions to generate, in advance of the first possible start point of uplink transmission for the allocated time-frequency resource, uplink transmissions for different transport block sizes corresponding to different start points; and the instructions to transmit the uplink transmission comprises instructions to transmit the uplink transmission for the transport block size corresponding to the start point of the uplink transmission.

Example Embodiment 70

The ED of any one of Example Embodiments 54 to 66, wherein the programming further comprises instructions to use rate matching or puncturing to fit a transport block into the remaining portion of the allocated time-frequency resource without changing the transport block size.

Example Embodiment 71

The ED of any one of Example Embodiments 54 to 70, wherein:

the ED is allocated a subset of subcarriers of a component carrier (CC) bandwidth;

the second LBT operation is a wideband LBT operation that is based on energy measured on all of the subcarriers of the CC bandwidth during one or more OFDM symbol intervals immediately preceding a start point within the allocated time-frequency resource; and the instructions to transmit the uplink transmission comprises instructions to transmit the uplink transmission on the allocated subset of subcarriers within the remaining portion of the allocated time-frequency resource with one or more blanking intervals based on the start point configuration.

Example Embodiment 72

The ED of any one of Example Embodiments 54 to 70, wherein:

the ED is allocated a subset of subcarriers of a component carrier (CC) bandwidth;

the second LBT operation is a narrowband LBT operation that is based on energy measured on the allocated subset of subcarriers during one or more OFDM symbol intervals immediately preceding a start point within the allocated time-frequency resource; and the instructions to transmit the uplink transmission comprises instructions to transmit the uplink transmission on the allocated subset of subcarriers within the remaining portion of the allocated time-frequency resource.

Example Embodiment 73

The ED of Example Embodiment 71 or 72, wherein the first LBT operation is a wideband LBT operation that is based on energy measured on all of the subcarriers of the CC bandwidth during one or more OFDM symbol intervals immediately preceding or immediately after a sub-frame boundary of the time-frequency resource.

Example Embodiment 74

The ED of any one of Example Embodiments 71 to 73, wherein the allocated subset of subcarriers correspond to the subcarriers of a physical resource block (PRB) within the allocated time-frequency resource.

Example Embodiment 75

The ED of any one of Example Embodiments 71 to 74, wherein:

the ED is allocated an interlace of a plurality of subsets of subcarriers of the CC bandwidth, the subsets of subcarriers of the interlace being distributed within the CC bandwidth;

the second LBT operation is one of a plurality of second LBT operations that are respectively based on energy measured on a respective one of the subsets of subcarriers of the CC bandwidth during one or more OFDM symbol intervals immediately preceding the start point within the allocated time-frequency resource; and the instructions to transmit the uplink transmission comprises instructions to transmit, within the remaining portion of the allocated time-frequency resource, an uplink transmission on one or more of the allocated subsets of subcarriers for which the respective narrowband LBT procedure was successful.

Example Embodiment 76

The ED of any one of Example Embodiments 54 to 70, wherein the instructions to transmit the uplink transmission comprises instructions to transmit the activation signal and/or a demodulation reference signal on the first one or more OFDM symbol intervals after a start point within the remaining portion of the allocated time-frequency resource.

Example Embodiment 77

The ED of any one of Example Embodiments 54 to 70, wherein the instructions to transmit the uplink transmission comprises instructions to: transmit the activation signal on the first one or more OFDM symbol intervals of a first start point after the second LBT operation is successful; and transmit a demodulation reference signal on the last one or more OFDM symbol intervals of a subframe at the end of the allocated time-frequency resource.

Example Embodiment 78

The ED of Example Embodiment 77, wherein the activation signal is sparse in the frequency domain.

Example Embodiment 79

The ED of any one of Example Embodiments 54 to 70 wherein:
the ED is allocated a set of subcarriers of a first component carrier (CC) bandwidth;
the first and second LBT operations are based on energy measured on the allocated set of subcarriers of the first CC bandwidth;
the instructions to transmit the uplink transmission comprises instructions to transmit a first uplink transmission on the allocated set of subcarriers of the first CC bandwidth within a first remaining portion of the allocated time-frequency resource;
the ED is allocated a set of subcarriers of a second CC bandwidth that is non-overlapping with the first CC bandwidth; and
the programming further comprises instructions to perform LBT operations that are based on energy measured on the allocated set of subcarriers of the second CC bandwidth at the same time that the LBT operations that are based on energy measured on the allocated set of subcarriers of the first CC bandwidth are performed.

Example Embodiment 80

The ED of Example Embodiment 79, wherein the programming further comprises instructions to:
continue to perform LBT operations that are based on energy measured on the allocated set of subcarriers of the second CC bandwidth at subsequent start points within the allocated time-frequency resource after the second LBT operation based on energy measured on the allocated set of subcarriers of the first CC bandwidth succeeds; and
in response to one of the LBT operations that are based on energy measured on the allocated set of subcarriers of the first CC bandwidth succeeding, transmit a second uplink transmission on the allocated set of subcarriers of the second CC bandwidth within a second remaining portion of the allocated time-frequency resource, the second uplink transmission comprising:
a second activation signal to indicate a start of the second uplink transmission; and
second uplink payload data.

Example Embodiment 81

The ED of any one of Example Embodiments 54 to 80, wherein:
there is a predefined mapping between code blocks of data and start point within the allocated time-frequency resource; and
the uplink payload data that is transmitted as part of the uplink transmission includes the code blocks of data that are mapped to start points within the remaining portion of the allocated time-frequency resource.

Example Embodiment 82

The ED of any one of Example Embodiments 54 to 80, wherein:
there is a predefined mapping between code blocks of data and start points within the allocated time-frequency resource; and
the uplink payload data that is transmitted as part of the uplink transmission includes a sequence of code blocks of data starting with the code block mapped to the first start point of the allocated time-frequency resource.

Example Embodiment 83

A base station comprising:
one or more processors; and
a non-transitory computer readable storage medium storing programming for execution by the one or more processors, the programming including instructions to:
transmit a first uplink grant message for a first electronic device (ED), the first uplink grant message indicating a time-frequency resource allocated to the first ED for uplink transmission in an unlicensed spectrum band;
monitor for detection of an activation signal associated with the first ED at start times based on a start point configuration within the allocated time-frequency resource until either the activation signal associated with the first ED is detected or the allocated time-frequency resource ends, the activation signal associated with the first ED indicating a start of uplink transmission from the first ED; and
in response to detecting the activation signal associated with the first ED, decode uplink payload data for the first ED received by the base station between the start of uplink transmission from the first ED and the end of the allocated time-frequency resource.

Example Embodiment 84

The base station of Example Embodiment 83, wherein the start point configuration indicates the configuration of a plurality of start point within a subframe.

Example Embodiment 85

The base station of Example Embodiment 83 or 84, wherein the programming further comprises instructions to:
pre-configure the start point configuration at the base station; and
transmit, from the base station, an information message indicating the start point configuration.

Example Embodiment 86

The base station of any one of Example Embodiments 83 to 85, wherein the activation signal is a demodulation reference signal (DMRS) associated with the first ED and the base station uses the DMRS to decode the uplink payload data for the first ED.

Example Embodiment 87

The base station of any one of Example Embodiments 83 to 86, wherein the instructions to decode uplink payload data for the first ED comprises instructions to decode the uplink payload data taking into account one or more blanking intervals within the remaining portion of the allocated time-frequency resource based on the mini-slot configuration.

Example Embodiment 88

The base station of any one of Example Embodiments 83 to 87, wherein the instructions to monitor for detection of the activation signal associated with the first ED comprises instruction to monitor for detection of the activation signal associated with the first ED starting at or after each of a plurality of start points within the allocated time-frequency resource until either the activation signal associated with the first ED is detected or the allocated time-frequency resource ends.

Example Embodiment 89

The base station of any one of Example Embodiments 83 to 88, wherein the instructions to monitor for detection of an activation signal associated with the first ED comprises instructions to monitor for detection of the activation signal at a pre-configured subset of the possible start points for uplink transmission within the allocated time-frequency resource.

Example Embodiment 90

The base station of Example Embodiment 89, wherein the pre-configured subset of possible start points includes every second possible start point for uplink transmission within the allocated time-frequency resource.

Example Embodiment 91

The base station of Example Embodiment 89 or 90 wherein the instructions to monitor for detection of an activation signal associated with the first ED comprises instructions to monitor for detection of a plurality of activation signals associated with the first ED, the plurality of activation signals comprising:
a first activation signal to indicate that uplink transmission started at a start point that preceded the start point at which the first activation signal is transmitted; and
a second activation signal to indicate that uplink transmission started at or after the start point at which the first activation signal is transmitted.

Example Embodiment 92

The base station of any one of Example Embodiments 83 to 91, wherein the instructions to decode the uplink payload data for the first ED in response to detecting the activation signal indicating the start of uplink transmission from the first ED comprises instructions to:
determine an expected transport block size for the uplink payload data based on a size of a remaining portion of the allocated time-frequency resource after the start of uplink transmission from the first ED; and
decode the uplink payload data based in part on the expected transport block size.

Example Embodiment 93

The base station of Example Embodiment 92, wherein the instructions to determine the expected transport block size comprises instructions to determine the expected transport block size based on a mapping between transport block sizes and possible start points for uplink transmission within the allocated time-frequency resource.

Example Embodiment 94

The base station of any one of Example Embodiments 83 to 91, wherein the instructions to decode the uplink payload data take into account rate matching or puncturing done by the first ED to fit a transport block into the remaining portion of the allocated time-frequency resource.

Example Embodiment 95

The base station of any one of Example Embodiments 83 to 94, wherein:
the first uplink grant message for the first ED indicates the first ED is allocated a first subset of subcarriers of a component carrier (CC) bandwidth within the time-frequency resource;
the instructions to monitor for detection of an activation signal associated with the first ED comprises instructions to monitor for the detection of the activation signal associated with the first ED on the first subset of subcarriers allocated to the first ED; and
the instructions to decode uplink payload data for the first ED in response to detecting the activation signal associated with the first ED comprises instructions to decode the uplink payload data for the first ED received by the base station on the first subset of subcarriers allocated to the first ED between the start of uplink transmission from the first ED and the end of the time-frequency resource.

Example Embodiment 96

The base station of Example Embodiment 95, wherein the programming further comprises instructions to:
transmit a second uplink grant message for a second ED, the second uplink grant message indicating the second ED is allocated a second subset of subcarriers of the CC bandwidth within the time-frequency resource for uplink transmission in the unlicensed spectrum band, the second subset of subcarriers being non-overlapping with the first subset of subcarriers;
monitor for detection of an activation signal associated with the second ED on the second subset of subcarriers at start times based on the start point configuration within the time-frequency resource until either the activation signal associated with the second ED is detected or the time-frequency resource ends, the activation signal associated with the second ED indicting a start of uplink transmission from the second ED; and
in response to detecting the activation signal associated with the second ED, decode uplink payload data for the second ED received by the base station on the second subset of subcarriers between the start of uplink transmission from the second ED and the end of the time-frequency resource.

Example Embodiment 97

The base station of Example Embodiment 96, wherein the allocated subsets of subcarriers correspond to the subcarriers of first and second physical resource blocks (PRBs), respectively, within the time-frequency resource.

Example Embodiment 98

The base station of any one of Example Embodiments 83 to 94, wherein:
the first uplink grant message for the first ED indicates the first ED is allocated a first interlace of a plurality of subsets of subcarriers of a component carrier (CC) bandwidth within the time-frequency resource, the subsets of subcarriers of the first interlace being non-overlapping and distributed within the CC bandwidth;

the instructions to monitor for detection of an activation signal associated with the first ED comprises instructions to monitor for the detection of the activation signal associated with the first ED on each of the subsets of subcarriers of the first interlace; and the instructions to decode uplink payload data for the first ED in response to detecting the activation signal associated with the first ED comprises instructions to decode uplink payload data for the first ED received by the base station on one or more of the subsets of subcarriers in the first interlace between the start of uplink transmission from the first ED and the end of the time-frequency resource.

Example Embodiment 99

The base station of Example Embodiment 98, wherein the programming further comprises instructions to:

transmit a second uplink grant message for a second ED, the second uplink grant message indicating the second ED is allocated a second interlace of a plurality of subsets of subcarriers of the CC bandwidth within the time-frequency resource for uplink transmission in the unlicensed spectrum band, the subsets of subcarriers of the second interlace being distributed within the CC bandwidth such that the second interlace is non-overlapping with the first interlace within the CC bandwidth;

monitor for detection of an activation signal associated with the second ED on each of the subsets of subcarriers of the second interlace at start times based on the start point configuration within the time-frequency resource until either the activation signal associated with the second ED is detected or the time-frequency resource ends, the activation signal associated with the second ED indicting a start of uplink transmission from the second ED on the respective subset of subcarriers on which the activation signal is transmitted; and in response to detecting the activation signal associated with the second ED, decode uplink payload data for the second ED received by the base station on one or more of the subsets of subcarriers in the second interlace between the start of uplink transmission from the second ED and the end of the time-frequency resource.

Example Embodiment 100

The base station of any one of Example Embodiments 83 to 94, wherein the instructions to decode the uplink payload data comprises instructions to decode the uplink payload data for the first ED based in part on a demodulation reference signal transmitted by the first ED as part of the uplink transmission on the first one or more OFDM symbol intervals of each start point between the start of uplink transmission from the first ED and the end of the allocated time-frequency resource.

Example Embodiment 101

The base station of any one of Example Embodiments 83 to 94, wherein the instructions to decode the uplink payload data comprises instructions to decode the uplink payload data for the first ED based in part on a demodulation reference signal transmitted by the first ED as part of the uplink transmission on the last one or more OFDM symbol intervals of a subframe at the end of the allocated time-frequency resource.

Example Embodiment 102

The base station of any one of Example Embodiments 83 to 94, wherein:

the first uplink grant message for the first ED indicates the first ED is allocated first and second component carrier (CC) bandwidths within the time-frequency resource;

the instructions to monitor for detection of an activation signal associated with the first ED comprises instructions to:

monitor for detection of a first activation signal associated with the first ED on a set of subcarriers of the first CC bandwidth, the first activation signal indicating a start of first uplink transmission from the first ED on the set of subcarriers of the first CC bandwidth; and monitor for detection of a second activation signal associated with the first ED on a set of subcarriers of the second CC bandwidth, the second activation signal indicating a start of second uplink transmission from the first ED on the set of subcarriers of the second CC bandwidth; and the instructions to decode uplink payload data for the first ED in response to detecting the activation signal comprises at least one of:

instructions to decode, in response to detecting the first activation signal associated with the first ED on the set of subcarriers of the first CC bandwidth, first uplink payload data for the first ED received by the base station on the set of subcarriers of the first CC bandwidth between the start of first uplink transmission from the first ED and the end of the allocated time-frequency resource; and instructions to decode, in response to detecting the second activation signal associated with the first ED on the set of subcarriers of the second CC bandwidth, second uplink payload data for the first ED received by the base station on the set of subcarriers of the second CC bandwidth between the start of second uplink transmission from the first ED and the end of the allocated time-frequency resource.

Example Embodiment 103

The base station of Example Embodiment 102, wherein the programming further comprises instructions to:

transmit a second uplink grant message for a second ED, the second uplink grant message indicating the second ED is allocated the set of subcarriers of the second CC bandwidth within the time-frequency resource for uplink transmission in the unlicensed spectrum band;

monitor for detection of an activation signal associated with the second ED on the set of subcarriers of the second CC bandwidth at start times based on the start point configuration within the time-frequency resource until either the activation signal associated with the second ED is detected or the time-frequency resource ends, the activation signal associated with the second ED indicating a start of uplink transmission from the second ED; and in response to detecting the activation signal associated with the second ED, decode uplink payload data for the second ED received by the base station on the set of subcarriers of the second CC bandwidth between the start of uplink transmission from the second ED and the end of the time-frequency resource.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to LTE terminology. However, the embodiments disclosed herein are not in any way limited to LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for an Electronic Device (ED) in a wireless network, the method comprising:
   receiving an uplink grant message from a base station, the uplink grant message indicating time-frequency resources allocated to the ED for uplink transmission in an unlicensed spectrum band, the allocated time-frequency resources located within a first set of subcarriers in a first channel and a second set of subcarriers in a second channel; and
   performing a first listen-before-talk (LBT) operation on the first set of subcarriers in the first channel and a second LBT operation on the second set of subcarriers in the second channel, both the first LBT operation and the second LBT operation being performed at a first start point within a subframe.

2. The method of claim 1, further comprising:
   performing a third LBT operation on the first set of subcarriers in the first channel and a fourth LBT operation on the second set of subcarriers in the second channel at a second start point within the subframe upon determining that both the first LBT operation and the second LBT operation have failed.

3. The method of claim 2, further comprising:
   upon determining that the third LBT operation has succeeded, transmitting an uplink transmission within a remaining portion of the allocated time-frequency resources, the uplink transmission comprising:
   an activation signal to indicate a start of the uplink transmission; and uplink payload data.

4. The method of claim 3, wherein the uplink payload data includes a sequence of code blocks mapped to the first start point and the second start point in accordance with a predefined mapping relationship.

5. The method of claim 4, wherein the sequence of code blocks starts with a code block mapped to the first start point in the allocated time-frequency resources.

6. The method of claim 4, wherein the sequence of code blocks starts with a code block mapped to the second start point in the remaining portion of the allocated time-frequency resources.

7. The method of claim 4, wherein a code block size is determined in accordance with a size of the allocated time-frequency resources.

8. The method of claim 3, further comprising:
   upon determining that the third LBT operation has succeeded, transmitting a reservation signal between the second start point and the closest orthogonal frequency division multiplexing (OFDM) symbol boundary after the second start point.

9. The method of claim 2, wherein each start point is either at an orthogonal frequency division multiplexing (OFDM) symbol boundary or midway between adjacent OFDM symbol boundaries within the allocated time-frequency resources.

10. The method of claim 2, wherein the first LBT operation and the third LBT operation are based on energy measured on the first set of subcarriers in the first channel and wherein the second LBT operation and the fourth LBT operation are based on energy measured on the second set of subcarriers in the second channel.

11. An Electronic Device (ED) comprising:
    one or more processors; and
    a non-transitory computer readable storage medium storing programming for execution by the one or more processors, the programming including instructions to:
    receive an uplink grant message from a base station, the uplink grant message indicating time-frequency resources allocated to the ED for uplink transmission in an unlicensed spectrum band, the allocated time-frequency resources located within a first set of subcarriers in a first channel and a second set of subcarriers in a second channel; and
    perform a first listen-before-talk (LBT) operation on the first set of subcarriers in the first channel and a second LBT operation on the second set of subcarriers in the second channel, both the first LBT operation and the second LBT operation being performed at a first start point within a subframe.

12. The ED of claim 11, wherein the programming further includes instructions to:
    perform a third LBT operation on the first set of subcarriers in the first channel and a fourth LBT operation on the second set of subcarriers in the second channel at a second start point within the subframe upon determining that both the first LBT operation and the second LBT operation have failed.

13. The ED of claim 12, wherein the programming further includes instructions to:
upon determining that the third LBT operation has succeeded, transmit an uplink transmission within a remaining portion of the allocated time-frequency resources, the uplink transmission comprising:
an activation signal to indicate a start of the uplink transmission; and
uplink payload data.

14. The ED of claim 13, wherein the uplink payload data includes a sequence of code blocks mapped to the first start point and the second start point in accordance with a predefined mapping relationship.

15. The ED of claim 14, wherein the sequence of code blocks starts with a code block mapped to the first start point in the allocated time-frequency resources.

16. The ED of claim 14, wherein the sequence of code blocks starts with a code block mapped to the second start point in the remaining portion of the allocated time-frequency resources.

17. The ED of claim 14, wherein a code block size is determined in accordance with a size of the allocated time-frequency resources.

18. The ED of claim 13, further comprising:
upon determining that the third LBT operation has succeeded, transmitting a reservation signal between the second start point and the closest orthogonal frequency division multiplexing (OFDM) symbol boundary after the second start point.

19. The ED of claim 12, wherein each start point is either at an orthogonal frequency division multiplexing (OFDM) symbol boundary or midway between adjacent OFDM symbol boundaries within the allocated time-frequency resources.

20. The ED of claim 12, wherein the first LBT operation and the third LBT operation are based on energy measured on the first set of subcarriers in the first channel and wherein the second LBT operation and the fourth LBT operation are based on energy measured on the second set of subcarriers in the second channel.

* * * * *